(12) United States Patent
Wang et al.

(10) Patent No.: US 7,568,015 B2
(45) Date of Patent: Jul. 28, 2009

(54) ROUTING DEVICE AND METHOD FOR USE WITH A HTTP ENABLED COMPUTER PERIPHERAL

(75) Inventors: Ynjiun Wang, Cupertino, CA (US); Garrison Gomez, Marietta, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1109 days.

(21) Appl. No.: 10/819,616

(22) Filed: Apr. 7, 2004

(65) Prior Publication Data

US 2005/0228887 A1    Oct. 13, 2005

(51) Int. Cl.
*G06F 15/177* (2006.01)
(52) U.S. Cl. .................. 709/220; 709/221; 709/223; 709/238; 710/8; 710/10
(58) Field of Classification Search .......... 709/220, 709/221, 223, 225, 226, 238; 710/8, 10, 710/15, 19
See application file for complete search history.

(56) References Cited

U.S. PATENT DOCUMENTS

| | | | |
|---|---|---|---|
| 5,901,286 | A | 5/1999 | Danknick et al. |
| 6,067,558 | A | 5/2000 | Wendt et al. |
| 6,209,048 | B1 | 3/2001 | Wolff |
| 6,311,165 | B1 | 10/2001 | Coutts et al. |
| 6,502,128 | B1 * | 12/2002 | Kumpf ................ 709/221 |
| 6,738,841 | B1 | 5/2004 | Wolff |
| 6,950,869 | B2 | 9/2005 | Iizuka |
| 7,009,956 | B2 * | 3/2006 | Heinonen et al. ........ 370/338 |
| 7,076,518 | B1 * | 7/2006 | Twede ................... 709/219 |
| 7,146,435 | B2 | 12/2006 | Williams et al. |
| 7,177,957 | B2 * | 2/2007 | Vance .................... 709/220 |
| 7,370,087 | B1 | 5/2008 | O'Toole, Jr. |

(Continued)

FOREIGN PATENT DOCUMENTS

CN          1168506 A         12/1997

(Continued)

OTHER PUBLICATIONS

International Searching Authority, Patent Cooperation Treaty Search Report, PCT/US2005/011422, Aug. 5, 2005, 7 pages.

(Continued)

*Primary Examiner*—Philip B Tran
(74) *Attorney, Agent, or Firm*—Marjama Muldoon Blasiak & Sullivan LLP

(57) ABSTRACT

The invention features a system and method for programming, integrating, and controlling the operation of computer peripherals. In brief overview, a computer peripheral is provided with a network communications protocol stack that includes a hypertext transfer protocol (HTTP) layer. The HTTP layer permits the computer peripheral to function as a thin web server. As such, the computer peripheral is able to respond to HTTP requests. In one embodiment, the invention includes a router that is in communication with the computer peripheral. The computer peripheral has an assigned HTTP port number and an assigned network address. The router includes a routing table that associates the computer peripheral's assigned HTTP port number with the computer peripheral's assigned network address. According to this embodiment, a message with a computer peripheral HTTP port number identifier is forwarded to the computer peripheral by the router.

37 Claims, 15 Drawing Sheets

U.S. PATENT DOCUMENTS

| | | |
|---|---|---|
| 7,454,476 B2 | 11/2008 | Kim et al. |
| 2002/0078200 A1 | 6/2002 | Helms |
| 2003/0023732 A1* | 1/2003 | Cohen .................. 709/223 |
| 2003/0142683 A1* | 7/2003 | Lam et al. ............. 370/401 |
| 2005/0021608 A1 | 1/2005 | Wolff |
| 2005/0138157 A1* | 6/2005 | Jung et al. ............ 709/223 |
| 2005/0268003 A1 | 12/2005 | Wang et al. |
| 2006/0029062 A1* | 2/2006 | Rao et al. ............. 370/389 |

FOREIGN PATENT DOCUMENTS

| | | |
|---|---|---|
| CN | 1534953 A | 10/2004 |
| DE | 19704694 A1 | 8/1997 |
| EP | 0 843 268 A2 | 5/1998 |
| EP | 0 903 675 A1 | 3/1999 |
| JP | 09-325925 A | 12/1997 |
| JP | 10-164115 A | 6/1998 |
| JP | 11-154127 A | 6/1999 |
| JP | 2003/076622 A | 3/2003 |
| JP | 2004/289855 A | 10/2004 |

OTHER PUBLICATIONS

Tom Williams, Java Goes To Work Controlling Networked Embedded Systems, Computer Design, Aug. 1996, pp. 36-37, vol. 35-No. 9, Pennwell Publications, Littleton, Massachusetts, US.

Examiner Philip B. Tran. Office Action for Corresponding U.S. Appl. No. 10/819,655 dated Mar. 17, 2009, 12 pages. (PTO-892 form attached).

* cited by examiner

| | | ← 130b |
|---|---|---|
| Image - reader | 3500 | 204.98.156.2 |
| Stripe - reader | 3600 | 204.98.156.3 |
| RFID - reader | 3700 | 204.98.156.4 |
| ... | | |

FIG. 4C

| | | ← 130c |
|---|---|---|
| Image - reader | 5800 | 75.210.52.2 |
| Stripe - reader | 1200 | 75.210.52.3 |
| RFID - reader | 2600 | 75.210.52.4 |
| ... | | |

FIG. 4D

| 3500 | 28.126.5.2 |
| --- | --- |
| 3600 | 28.126.5.3 |
| 3800 | 28.126.5.3 |
| 3900 | 28.126.5.4 |
| 4000 | 28.126.5.3 |
| 4100 | 28.126.5.3 |

↗130d

| 3600 | 198.106.18.2 |
| --- | --- |
| 3800 | 198.106.18.3 |
| 4100 | 198.106.18.4 |

ROUTING DEVICE AND METHOD FOR USE WITH A HTTP ENABLED COMPUTER PERIPHERAL

CROSS-REFERENCE TO RELATED APPLICATIONS

This application is related to the application No. 10/819,655 enumerated below, filed with the United States Patent and Trademark Office contemporaneously with the present application on Apr. 7, 2004 by Express Mail and subject to assignment to the same assignee of this application, the disclosure of which is incorporated herein by reference in its entirety: entitled "HTTP Enabled Computer Peripheral."

FIELD OF THE INVENTION

The invention relates generally to computer peripherals connected to computing devices or computer networks. More particularly the invention relates to enabling computer peripherals to respond to hypertext transfer protocol requests.

BACKGROUND

Currently there are a myriad of computer peripherals that can be attached to a computer network or to a computing device to provide input data or to enhance the functionality of the computing device or of computers attached to the computer network. Common examples of such peripherals include: a computer mouse, keyboards, printers, external disk drives, and the like.

Typically creating an environment in which computer peripherals can easily interface with a computer network or a computing device has been a significant challenge. First, each device usually has its own software and hardware interfaces requiring specific device drivers and sometimes special physical connections for each device. For example, enabling the easy connectivity of computer printers, one of the most common computer peripherals, requires that personal computer operating systems now typically come equipped with hundreds of printer device drivers. For more specialized devices manufactured by a host of companies, such a solution is not practical. An alternative approach has been to include device driver material with each peripheral device. This approach has the disadvantage of requiring user intervention to establish proper operation.

A further approach has been to attempt to standardize the operation of classes of computer peripherals so that a single device driver can be used for an entire class of devices. For example with point-of-sale cash registers, many associated peripheral devices have RS232 or RS488 physical interfaces and software interfaces defined according to an IBM standard. Similarly with image scanners, the TWAIN standard has been proposed. This approach also has disadvantages. First, each class of peripheral device still has its own specific hardware and software interfaces. In addition, such standards may not be ideal for all devices within the class. For example, the TWAIN standard was designed for flatbed scanners, and, therefore, simple instructions for hand-held image readers, such as a trigger pull, are not easily supported. Further, these specific interfaces when combined with the corresponding instruction set require significant technical expertise for developers wishing to integrate the use of a particular computer peripheral into an application.

For example, a developer will frequently be required to dedicate significant time to learning a computer peripheral specific application programming interface (API). Commonly these APIs in addition require a developer to be conversant with advanced computer programming languages such as C or C++. Further, once the new operating code has been written, the operating system must be recompiled and distributed to potentially thousands of terminals throughout a network. Also, prior to the distribution of the recompiled code in some systems, such as the operating system Windows® CE, extensions to the operating system must be reviewed, evaluated, certified by Microsoft® WHQL (or another third party) and given tentative approval pending the results of actual implementation. In general, therefore, the specialized technical skills combined with the distribution and approval challenges presented by the integration of new and specialized computer peripherals represents a significant barrier to their adoption by IT professionals and the general public.

What is needed is a system and method to allow a broad range of computer peripherals to be automatically recognized and to function without user intervention when connected to a computer network or a computing device. Further what is needed is a system and method to allow for the easy programming and integration of such computer peripherals.

SUMMARY OF THE INVENTION

In one aspect the invention features a hypertext transfer protocol enabled computer peripheral for augmenting the functionality of an associated computing device. The hypertext transfer protocol enabled computer peripheral comprises an interface module for exchanging communications with the associated computing device. The associated computing device can be of an arbitrary form factor. The computer peripheral also comprises a data module in communication with the interface module. The data module is adapted to perform at least one of a data input and a data output function. Further the computer peripheral comprises a network communications protocol stack module in communication with the interface module and the data module. Additionally the computer peripheral comprises a hypertext transfer protocol layer module in the network communications protocol stack module. The hypertext transfer protocol layer module enables the computer peripheral to respond to hypertext transfer protocol requests from the associated computing device. Further the computer peripheral has an address that includes a reference to the associated computing device.

In one embodiment, the reference is a network address. In a further embodiment the network address is an Internet protocol address. In another embodiment, the reference is a hypertext transfer protocol localhost reference. In various embodiments of the hypertext transfer protocol enabled computer peripheral, the exchanged communications include messages identified by hypertext transfer port numbers or messages identified by computer peripheral textual identifiers. In another embodiment, the computer peripheral also comprises a transfer control protocol/Internet protocol layer module and/or a user datagram protocol layer module in the network communications protocol stack module.

In additional various embodiments of the hypertext transfer protocol enabled computer peripheral, the associated computing device is a portable data terminal, a transaction terminal, a cash register, or a personal data assistant. In further various embodiments, the hypertext transfer protocol enabled computer peripheral is an image reader, a magnetic stripe card reader, a smart card reader, a RF payment reader, a RFID reader, a receipt printer, a biometric reader, or a fingerprint reader.

In another embodiment, the hypertext transfer protocol enabled computer peripheral comprises a decoding module in communication with the data module. The decoding module decodes data collected by the data module. In a further embodiment the hypertext transfer protocol enabled computer peripheral also comprises an extensible markup language module that parses hypertext mark-up language documents to extract hypertext mark-up language commands. In various additional embodiments, the interface module, the data module, the network communications protocol stack module, and the hypertext transfer protocol layer module are implemented in different combinations of hardware and software.

In another embodiment of the hypertext transfer protocol enabled computer peripheral, the associated computing device is located within a first housing and the computer peripheral is located within a second separate housing. In an additional embodiment, the computer peripheral is integrated within a housing of the associated computing device. In a further embodiment of the computer peripheral, the interface module includes components designed in accordance with the CompactFlash standard.

In another aspect the invention features a hypertext transfer protocol enabled computer peripheral for augmenting the functionality of an associated computing device. The hypertext transfer protocol enabled computer peripheral comprises an interface module for exchanging communications with the associated computing device. The associated computing device can be of an arbitrary form factor. The computer peripheral also comprises a data module in communication with the interface module. The data module is adapted to perform at least one of a data input and a data output function. Further the computer peripheral comprises a network communications protocol stack module in communication with the interface module and the data module. Additionally the computer peripheral comprises a hypertext transfer protocol layer module in the network communications protocol stack module. The hypertext transfer protocol layer module enables the computer peripheral to respond to hypertext transfer protocol requests from the associated computing device. Further, functionality provided by the data module is lacking from the associated computing device in the absence of the computer peripheral.

In another aspect the invention features a hypertext transfer protocol enabled computer peripheral for augmenting the functionality of an associated computing device. The hypertext transfer protocol enabled computer peripheral comprises an interface module for exchanging communications with the associated computing device. The associated computing device can be of an arbitrary form factor. The computer peripheral also comprises a data module in communication with the interface module. The data module is adapted to perform at least a computer memory function. Further the computer peripheral comprises a network communications protocol stack module in communication with the interface module and the data module. Additionally the computer peripheral comprises a hypertext transfer protocol layer module in the network communications protocol stack module. The hypertext transfer protocol layer module enables the computer peripheral to respond to hypertext transfer protocol requests from the associated computing device. Further the computer peripheral has an address that includes a reference to the associated computing device. In one embodiment, the reference is a network address. In another embodiment the network address is an Internet protocol address. In a further embodiment, the reference is a hypertext transfer protocol localhost reference In another aspect the invention features a modular data collection system comprising a base unit and a modular data collection peripheral unit. The base unit has a housing, a processor, a memory, and a first mechanical connector. The modular data collection peripheral unit is devoid of a browser, is in communication with the base unit, and has a second housing. The modular data collection peripheral unit also has a processor and a software module that allows the peripheral unit to respond to hypertext transfer protocol requests.

In one embodiment of the modular data collection system, the base unit has a first electromechanical connector and the modular data collection peripheral unit has a second electromechanical connector. The first and second electromechanical connectors allow the modular data collection peripheral unit to be detachably attached to the base unit.

In various additional embodiments of the modular data collection system, the base unit is a transaction terminal, a portable data terminal, a personal data assistant, or a cash register. In further various embodiments of the modular data collection system, the modular data collection peripheral unit is an image reader, a smart card reader, a magnetic stripe reader, a biometric reader, a finger print reader, a receipt printer, a RFID reader, or a RF payment reader.

In another aspect, the invention features a system for enabling hypertext transfer protocol communication. The system comprises a plurality of computing devices each of which have a display, interface mechanisms, a network interface, and a computer peripheral interface. The system also comprises a plurality of computer peripherals, each of the plurality of computer peripherals is associated with and in communication with one of the plurality of computing devices via said computer peripheral interface. Each of the plurality of computer peripherals includes a data module that has hardware adapted to perform at least one of a data input function and a data output function. The system additionally comprises a central computer in communication with said plurality of computing devices. The central computer responds to hypertext transfer protocol requests from the plurality of computing devices and the plurality of computer peripherals respond to hypertext transfer protocol requests from the plurality of computing devices and from the central computer.

In various embodiments of the system, the plurality of computing devices includes transaction terminals, portable data terminals, personal data assistants, and/or cash registers. In additional various embodiments, the plurality of computer peripherals include image readers, magnetic stripe readers, RFID readers, RF payment readers, smart card readers, biometric readers, finger print readers and/or receipt printers.

In another aspect, the invention features a method that enables a router to forward hypertext transfer protocol port number identified messages. The method comprises establishing communication between the router and a computer peripheral, requesting that a network address be assigned to the computer peripheral, and transmitting an advertisement by the computer peripheral. The advertisement includes at least the computer peripheral's assigned network address and a hypertext transfer protocol port number assigned to the computer peripheral. The method also comprises configuring the router to automatically associate the hypertext transfer protocol port number assigned to the computer peripheral with the network address of the computer peripheral in response to the advertisement. Further, the method comprises forwarding the hypertext transfer protocol port number identified message to the computer peripheral based on at least the hypertext transfer port number assigned to the computer peripheral.

In one embodiment of the method, the forwarding of the hypertext transfer protocol port number identified message to the computer peripheral is also based on at least determining a version of the computer peripheral. In another embodiment of the method, the forwarding of the hypertext transfer protocol port number identified message to the computer peripheral is also based on at least determining a network proximity of said computer peripheral.

In one embodiment of the method, the network address is an Internet protocol address. In another embodiment of the method, the Internet protocol address is assigned by a Dynamic Host Configuration Protocol server. In a further embodiment of the method, the Internet protocol address is assigned in response to a request from a Dynamic Host Configuration Protocol client on the computer peripheral. In yet another embodiment of the method, the advertisement further includes at least a list of capabilities of the computer peripheral. In yet an additional embodiment of the method, the router is contained in a computing device, and the computing device maintains a list of capabilities of attached computer peripherals. In yet a further embodiment, the method also comprises transmitting an advertisement by the computing device. The advertisement from the computing device includes at least hypertext transfer protocol port numbers of attached computer peripherals and capabilities of attached computer peripherals.

In yet another aspect, the invention features a system that enables messages to be forwarded based on at least hypertext transfer protocol port numbers. The system comprises a router in communication with a computer peripheral that has an assigned hypertext transfer protocol port number and an assigned network address. The system also comprises a routing table in the router that automatically associates the assigned hypertext transfer protocol port number and the assigned network address in response to an advertisement from the computer peripheral. The advertisement includes at least the assigned hypertext transfer protocol port number and the assigned network address.

In one embodiment of the system, the network address is an Internet protocol address. In another embodiment of the system, the Internet protocol address is assigned by a Dynamic Host Configuration Protocol server. In a further embodiment, the Internet protocol address is assigned in response to a request from a Dynamic Host Configuration Protocol client on the computer peripheral. In another embodiment of the system, the advertisement further includes at least a list of capabilities of said computer peripheral. In yet another embodiment of the system, the router is contained in a computing device that maintains a list of capabilities for a plurality of attached computer peripherals. In yet an additional embodiment of the system, the computing device transmits an advertisement including at least hypertext transfer protocol port numbers and capabilities for each of the plurality of attached computer peripherals.

In various embodiments of the system, the computing device is a transaction terminal, a portable data terminal, a personal data assistant, or a cash register. In further various embodiments, the computer peripheral is an image reader, a RFID reader, a RF payment reader, a smart card reader, a biometric reader, a finger print reader or a receipt printer. In an additional embodiment of the system, the hypertext transfer protocol port numbers are assigned dynamically.

In a further aspect, the invention features an apparatus for enabling a router to forward hypertext transfer protocol port number identified messages. The apparatus comprises means for establishing communication between the router and a computer peripheral. The apparatus also comprises means for requesting that a network address be assigned to the computer peripheral. In addition the apparatus comprises means for transmitting an advertisement by the computer peripheral. The advertisement includes at least the assigned network address and a hypertext transfer protocol port number assigned to the computer peripheral. The apparatus further comprises means for configuring the router to associate the hypertext transfer protocol port number assigned to the computer peripheral with the network address of the computer peripheral automatically in response to the advertisement. Additionally the apparatus comprises means for forwarding the hypertext transfer protocol port number identified message to the computer peripheral based on at least the hypertext transfer port number assigned to the computer peripheral.

In one embodiment of the apparatus, forwarding the hypertext transfer protocol port number identified message to the computer peripheral is also based on at least determining a version of the computer peripheral. In another embodiment of the apparatus, forwarding the hypertext transfer protocol port number identified message to the computer peripheral is also based on at least determining a network proximity of the computer peripheral. In a further embodiment of the apparatus, the network address is an Internet protocol address. In yet another embodiment of the apparatus, the Internet protocol address is assigned by a Dynamic Host Configuration Protocol server. In yet an additional embodiment of the apparatus, the Internet protocol address is assigned in response to a request from a Dynamic Host Configuration Protocol client on the computer peripheral. In yet a further embodiment of the apparatus, the advertisement further includes a list of capabilities of said computer peripheral. In still another embodiment of the apparatus, the router is contained in a computing device that maintains a list of capabilities of attached computer peripherals. In still an additional embodiment, the apparatus further comprises means for transmitting an advertisement by the computing device. The advertisement from the computing device includes at least hypertext transfer protocol port numbers of attached computer peripherals and capabilities of attached computer peripherals.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4C is a block diagram of an embodiment of a routing table that includes textual identifiers used in one embodiment of the invention.

FIG. 4D is a block diagram of an embodiment of a routing table that includes textual identifiers used in one embodiment of the invention that employs dynamically allocating HTTP port numbers.

FIG. 6B shows routing tables used by elements of the system of FIG. 6A.

DETAILED DESCRIPTION

The invention features a system and method for programming, integrating, and controlling the operation of computer peripherals. In brief overview, a computer peripheral is provided with a network communications protocol stack that includes a hypertext transfer protocol (HTTP) layer. The HTTP layer permits the computer peripheral to function as a thin web server. As such, the computer peripheral is enabled to respond to HTTP requests. According to one embodiment of the invention, a computing device, such as a portable data terminal, can treat the computer peripheral, such as a bar code scanner, as one of the ports in the HTTP protocol. With the computer peripheral HTTP enabled, programming the computing device to utilize the computer peripheral can be accomplished by writing an extensible mark-up language (XML) document that optionally includes a program component such as a javascript.

In one embodiment, the invention includes a router that automatically configures itself to properly forward messages with HTTP port identifiers in response to the attachment of a HTTP enabled computer peripheral. In another embodiment, the router in the computing device includes a Dynamic Host Configuration Protocol (DHCP) server and/or a DHCP client. In an additional embodiment, the computer peripheral includes a DHCP client. In a further embodiment, the HTTP layer resides on a transfer control protocol/Internet protocol (TCP/IP) layer. In an alternative embodiment, the HTTP layer resides on a User Datagram Protocol (UDP) layer. In yet another embodiment, the network communications protocol stack in the computer peripheral includes a XML parser.

Figure 1:
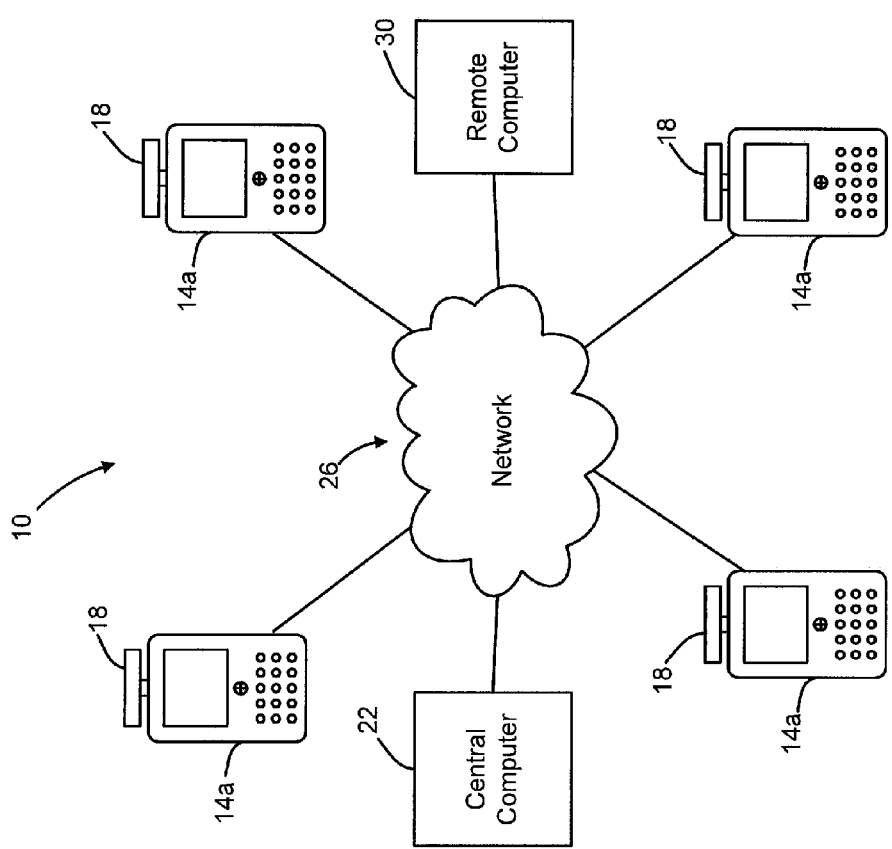
FIG. 1 shows an embodiment of a networked system of computing devices with attached computer peripherals according to the principles of the invention.

FIG. 1 shows an embodiment of a data collection system 10 in accordance with the principles of the invention. The system 10 includes a plurality of portable data collection terminals (PDT) 14a, a plurality of computer peripherals 18, a central computer 22, a network 26, and a remote computer 30. Also as shown in FIG. 1, each PDT 14a is in communication with a computer peripheral 18. The computer peripherals 18 can include any data input, data output, or function specific device that can be connected to an associated PDT 14a to augment the PDT's functionality. Such devices include, but are not limited to: bar code scanners, image readers, smart card readers, radio frequency identification (RFID) readers, radio frequency (RF) payment readers, receipt printers, magnetic stripe readers, biometric readers, finger print readers, keyboards, computer mice, printers, computer memory and the like. In some embodiments, the scanners and readers can also including decoding functionality. In one embodiment, the PDTs 14a can be any one of the Dolphin® 7200, 7300, or 7400 Mobile Computers available from Hand Held Products, Inc. of 700 Visions Drive, P.O. Box 208, Skaneateles Falls, N.Y. constructed in accordance with the principles of the invention. While the system 10 includes the plurality of PDTs 14a, analogous systems employing alternative computing devices (generally 14) can be constructed in accordance with the invention. In alternative embodiments, the computing devices 14 can be transaction terminals 14b, personal data assistants, cash registers 14c, point-of-sale devices. In additional alternative embodiments, the computing devices 14 can be of arbitrary form factor. The transaction terminals 14b and the cash registers 14c are discussed below more extensively in particular with respect to FIGS. 6A, 6B, and 7. In one embodiment, the functionality provided by the computer peripheral 18 does not exist in the computing device 14 prior to the addition of the computer peripheral 18.

Referring to the network 26 in further detail, the network 26 can represent a single local area wired or wireless network or alternatively the network can include a plurality of interconnected networks. In one embodiment, the PDT's 14a are connected to a local wireless network according to any of the 802.11 standards. In an additional embodiment, the wireless network is a TCP/IP network and each PDT 14a is assigned a unique IP address. For example, if there were 100 PDTs 14a their addresses could run from 192.128.1.1 to 192.128.1.100. In this embodiment the central computer 22 is also in communication with the local area wireless network and is assigned a unique IP address. As discussed below the assignment of IP addresses can be handled by a DHCP server. In one embodiment the local network includes a Domain Name Server (DNS) so that the central computer 22 and the PDTs 14a can be addressed, respectively, as:

central.computer
1.PDT, . . . , 100.PDT

Also in communication with the network 26 is the remote computer 30. The remote computer's connection can by any applicable connection such as a local area connection, a metro area connection, or a wide area connection such as an Internet connection.

Figures 2A, 2B:
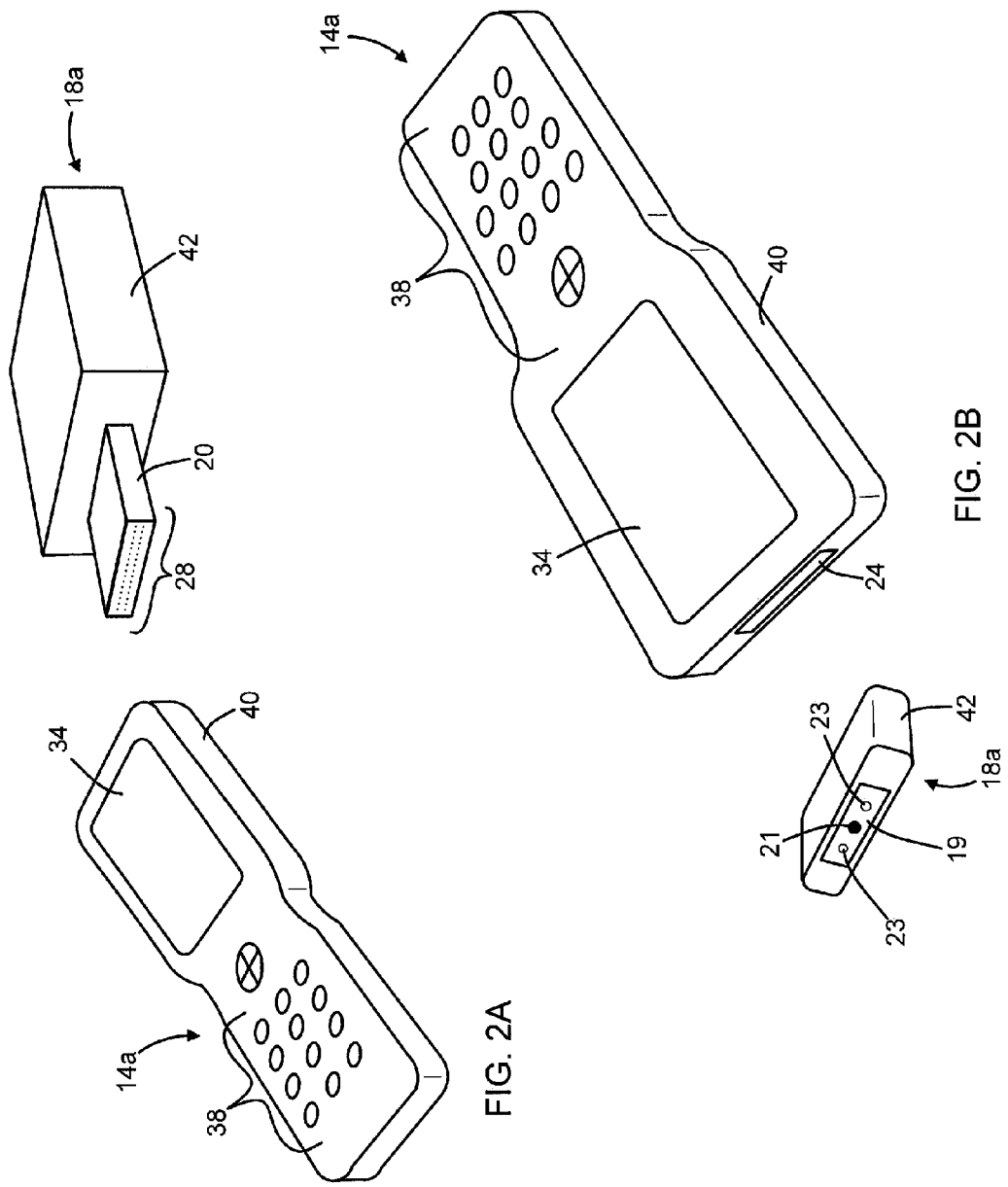
FIGS. 2A and 2B are perspective drawings of one embodiment of a portable data terminal and an image reader and decoder computer peripheral constructed according to the principles of the invention.

FIGS. 2A and 2B show the details of one embodiment of the coupling between one of the PDTs 14a and one of the computer peripherals 18. In the embodiment shown, the PDT 14a is contained in a first housing 40 and the computer peripheral 18 is contained within a second housing 42. In alternative embodiments, the computer peripheral 18 can be integrated within a computing device 14. In the embodiments of FIGS. 2A and 2B, the computer peripheral is an image reader and decoder 18a. The image reader and decoder 18a includes an imager 19 having a lens 21 and a plurality of illumination sources 23. In one embodiment, the imager 19 is any one of the IMAGETEAM™ linear or area (2D) imaging engines, such as the 4000 OEM 2D Image Engine or the 3800E Linear Imaging Engine, available from Hand Held Products, Inc. In various embodiments, the image reader and decoder 18a and the PDT 14a are joined via an electromechanical interface that includes contact and non-contact systems used in establishing electrical and/or mechanical connections between devices, such as electrometrical connectors or wireless connections. For the embodiment shown in FIGS. 2A and 2B, the electromechanical interface includes an insertion portion 20 with a plurality of sockets 28 for electrical pins and a receptacle portion 24.

In one embodiment, the electromechanical interface is designed in accordance with the CompactFlash standard as described in the CompactFlash Specification version 2.0 maintained at the website http://www.compactflash.org. The CompactFlash Specification version 2.0 document is herein incorporated by reference in its entirety. In another embodiment, the electromechanical interface is designed in accordance with the PC Card Standard as described by, for example, the PC Card Standard 8.0 Release—April 2001 maintained by the Personal Computer Memory Card International Association (PCMCIA) and available through the website at http://www.pcmcia.org. The PC Card Standard 8.0 Release—April 2001 Specification version 2.0 document is herein incorporated by reference in its entirety. In further embodiments, the electromechanical interface is designed in accordance with the Secure Digital standard for memory and the Secure Digital Input Output for interfacing with input/output devices. In additional embodiments, the electromechanical interface can be constructed in accordance with alternative proprietary or non-proprietary couplings that provide electrical and mechanical interfaces between the computer peripheral 18 and the PDT 14a. With the insertion portion 20 inserted into the receptacle portion 24, the electrical and mechanical connectors of the insertion portion 20 and the receptacle portion 24 are rigidly in contact thereby establishing a fixed relative position and electrical communication between the image reader and decoder 18a and the PDT 14a.

To facilitate interaction with a user, the PDT 14a also includes a display 34 and a plurality of interface mechanisms 38, such as buttons and joysticks. In an alternative embodiment, the communication between the PDT 14a and the computer peripheral 18 need not include the direct attachment of the computer peripheral 18 to the PDT 14a and can be, for example, via a cable or a wireless connection. In additional alternative embodiments, the mechanical and electrical coupling components include moveable elements that permit a flexible attachment of a computer peripheral 18 to a computing device 14. Although only one computer peripheral 18a is shown in FIGS. 2A and 2B, the invention contemplates that more than one computer peripheral can be attached to a computing device 14 such as the PDT 14a.

Figure 2C:
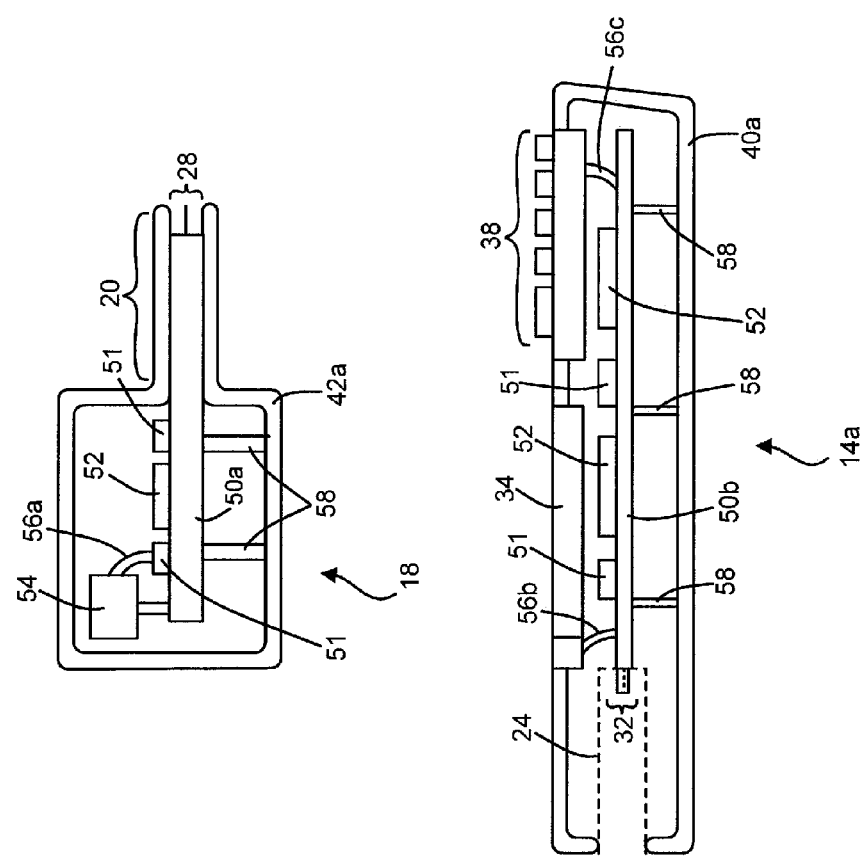
FIG. 2C shows a cross-sectional view of one embodiment of a portable data terminal and a computer peripheral constructed in accordance with the principles of the invention.

FIG. 2C shows a cross-sectional view of one embodiment of a PDT 14a and a computer peripheral 18. The computer peripheral 18 includes a housing 42a, printed circuit board 50a, at least one integrated circuit 52, such as a processor, and electrical components 51 on the PCB 50a, a data module 54 in electrical communication with the PCB 50a via a ribbon connector 56a, a electromechanical interface insertion portion 20, and PCB mounting struts 58. The PDT 14a includes a housing 40a, a PCB 50b, at least one integrated circuit 52, such as a processor, and electrical components 51 on the PCB 50b, a display 34 in electrical communication with the PCB 50b via the ribbon connector 56b, a plurality of interface mechanisms 38 in electrical communication with the PCB 50b via the ribbon connector 56c, electromechanical interface reception portion 24, and PCB mounting struts 58. The reception portion 24 includes a plurality of rows of pins 32 for insertion into the plurality of rows of sockets 28. In various embodiments, the data module 54 can perform various data input and/or data out functions such as scanning or reading bar codes, symbols, graphics or indicia, reading smart card data, reading biometric data, reading fingerprint data, reading RF payment data, reading RFID data, reading magnetic stripe card data, printing documents, displaying information, and the like. In alternative embodiments, the data module 54 provides computer memory functionality. In various embodiments, this computer memory can be supplemental to computer memory already present in the computing device 14 and can be designed to perform specialized functions such as fast storage and retrieval of digital information such as digitized video, images, sound, and/or text.

Figure 3:
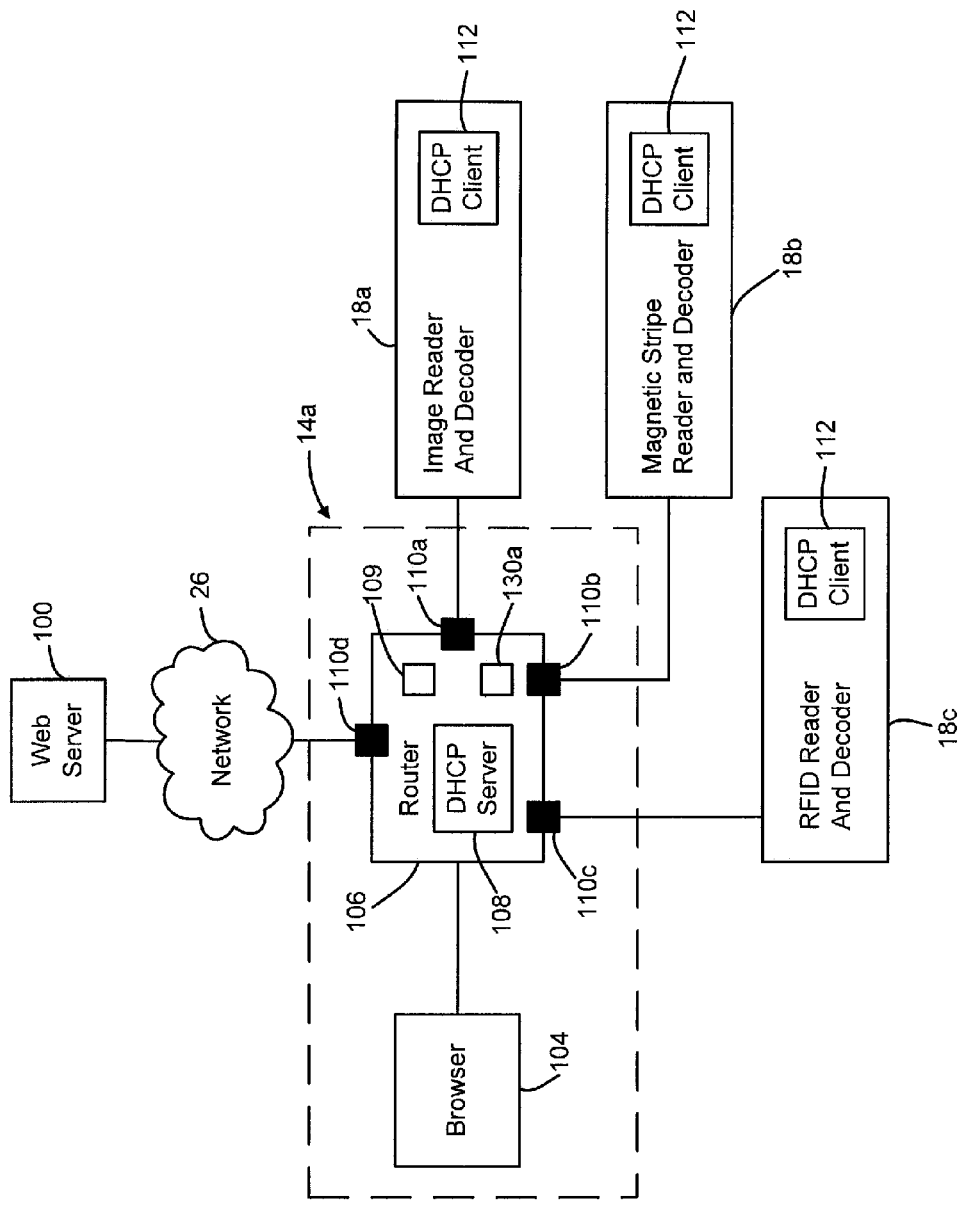
FIG. 3 is a block diagram of an embodiment of some of the functional components of the system of FIG. 1.

FIG. 3 shows block diagrams illustrating operational components of the system 10 shown in FIG. 1. In particular, FIG. 3 includes a web server 100, a browser 104, a router 106, and a plurality of computer peripherals 18a, 18b, 18c. In one embodiment, the web server 100 is located on the central computer 22 and the browser 104 and the router 106, as indicated by the dashed line, are located on a PDT 14a. As used herein the term browser 104 covers not only traditional browsers, such as Internet Explorer by Microsoft®, but also simplified HTTP communication modules that are used, for example, in computing devices with limited processor capacity. The browser 104 can include or be devoid of a graphical component. Operationally the browser 104 is partially defined by its ability to support HTTP communication and to interpret and execute XML code. Also as used herein, the term router 106 covers routing and network devices that route, forward and/or direct network communications in a network or between networks.

As shown in FIG. 3, the browser 104 is in communication with the web server 100 by way of the router 106 and the network 26. The connection between the web server 100 and the router 106 includes an interface 110d. In the embodiment where the browser 104 and the router 106 are both resident on the PDT 14a, the communication between the browser 104 and the router 106 includes internal software and electrical interfaces. The router 106 is also in communication with a plurality of physical interfaces 110a, 110b, 110c (generally 110). The physical interfaces 110 can be any of those commonly used to connect computer peripherals 18 such as USB, Ethernet, PCMCIA, RS232, RS488, CompactFlash, PCMCIA PC Card, infrared, Bluetooth, wireless, and the like. In the embodiment shown in FIG. 3, an image reader and decoder 18a is connected to the physical interface 110a, a magnetic stripe reader and decoder 18b is connected to the physical interface 110b, and a RFID reader and decoder 18c is connected to the physical interface 18c. Although only three computer peripherals 18 are in communication with the router 106 in FIG. 3, the invention contemplates that an arbitrary number of computer peripherals 18 can be placed in communication with the router 106. Also as show in FIG. 3, the router 106 includes a DHCP server 108 and the computer peripherals 18 each include a DHCP client 112. The operation of the DHCP server 108 and the DHCP clients 112 in assigning IP addresses is described in more detail below. The router 106 also includes a capabilities list 109, for storing information regarding the capabilities of the attached computer peripherals 18, and a routing table 130a (generally 130). In alternative embodiments, the capabilities list 109 is stored elsewhere in the PDT 14a or on another device in the network 26. As used herein the term routing table covers the variety of data structures, such as associational tables, that can be used by a router 106 in routing or forwarding messages.

Figure 4A:
FIG. 4A is a block diagram of an embodiment of a routing table used by one of the functional components of FIG. 3.

FIG. 4A shows an example of the routing table 130a used by the router 106 in one embodiment of the invention. According to one embodiment of the invention, each type of computer peripheral 18 is assigned a unique HTTP port number. In the illustrative example of FIG. 4A, image readers and decoders 18*a* are assigned the HTTP port number 3500, magnetic stripe code readers and decoders 18*b* are assigned the HTTP port number 3600, and RFID readers and decoders 18*c* are assigned the HTTP port number 3700. With these assignments, the routing table associates the HTTP port 3500 number with the dynamically allocated IP address of the image reader and decoder 18*a*. By way of example, the IP address is shown as 108.112.12.2 in FIG. 4A. Similarly the HTTP ports 3600 and 3700 are associated, respectively, with the dynamically allocated IP addresses 108.112.12.3 and 108.112.12.4 of the magnetic stripe reader and decoder 18*b* and the RFID 18*c* reader and decoder. Also as shown, a network device, such as another router, that connects the router 106 to the network 26 is associated with the IP address 192.168.0.24. The network device's IP address 192.168.0.24 can be assigned by another device such as the central server 22. In one embodiment, the router is directly connected by a wired or wireless connection to the central server 22 and the physical interface 110*d* is associated with the address of the central server 22.

Figure 4B:
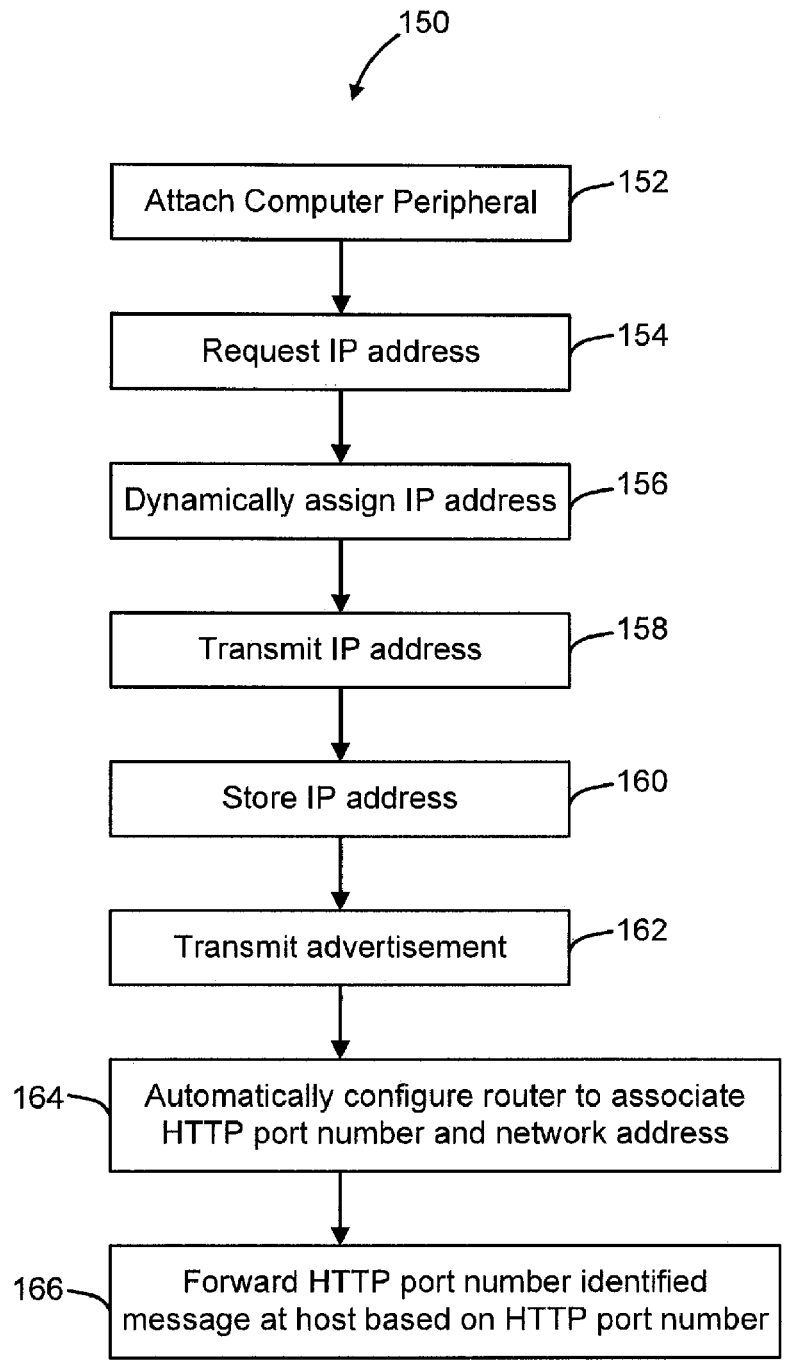
FIG. 4B is a flow chart for a process for a router to manage network communications with computer peripherals according to one embodiment of the invention.

Referring to FIG. 4B, a one embodiment of a process 150 for configuring the router 106 to forward or direct network communication with HTTP port number identifiers to the proper computer peripherals 18 is shown. The process 150 includes dynamically allocating IP addresses to the computer peripherals 18 and associating the dynamically allocated IP addresses with HTTP port numbers, as shown in the routing table 130*a* of FIG. 4A. In particular, the process 150 includes attaching (step 152) a computer peripheral 18, for example the image reader and decoder 18*a*, to the router 106. After the computer peripheral 18 is attached to the router 106, the DHCP client 112 on the computer peripheral 18, sends (step 154) a communication to the router 106 requesting an IP address. In response to the IP address request, the DHCP server 108 dynamically assigns (step 156) an IP address from a master list and communicates (step 158) this IP address, for example the IP address 108.112.12.2 to the computer peripheral 18. The computer peripheral 18 stores (step 160) its newly assigned and dynamically allocated IP address and then sends (step 162) an advertisement. In one embodiment, the advertisement includes the dynamically allocated IP address and the computer peripheral's assigned HTTP port number, for example 3500. In another embodiment, the advertisement also includes a capabilities list for the computer peripheral 18 including, for example, the imager's pixel size, color capacity, and resolution. In a further embodiment, the advertisement can include a textual identifier for the computer peripheral 18 as discussed below. In an additional embodiment the advertisement is sent by a communications module in the router 106.

In an alternative embodiment, the capabilities list is stored in the computer peripheral 18 and the advertisement contains the name and address of the file containing the capabilities list. For example, the address of the image reader and decoder's capabilities list could be 108.112.12.2:3500/imager_capability and any device needing the information could access the information by sending a request to the imager reader and decoder 18*a* to download the imager_capability file. With the information contained in the advertisement, the router 106 automatically configures itself to associate (step 164) the HTTP port number with the dynamically allocated IP address contained in the broadcast message. In an alternative embodiment of the process 150, the IP addresses are statically as opposed to dynamically allocated.

With the HTTP port number to IP address associations in the routing table 130*a*, the router 106 is able to direct or forward (step 166) communications identified by a HTTP port number to the IP address of the corresponding computer peripheral 18 based at least on the HTTP port number. Parameters in addition to HTTP port numbers that can be used in forwarding and directing messages in alternative embodiments are discussed below. In addition to updating the routing table 130, the advertisement is used to add the capabilities of the newly attached computer peripheral 18 to the capabilities list 109. For example as shown in FIG. 3, corresponding to the routing table 130*a* would be a capabilities list 109 indicating that attached to the router 106 were the image reader and decoder 18*a*, the magnetic stripe reader and decoder 18*b*, and the RFID reader and decoder 18*c*. In an alternative embodiment, the process 150 does not include a computer peripheral 18 being directly physically attached to the router 106. In this embodiment, the process 150 can be initiated by the DHCP client's request for an IP address.

In an alternative embodiment, HTTP port numbers can be addressed by textual identifiers, analogous to the functionality provided by a DNS. This allows messages to be identified either by HTTP port number or by textual identifier such as device names such as image_reader, stripe_reader, RFID_reader, and the like. In this embodiment analogous to process 150, a newly attached computer peripheral is assigned an IP address. The computer peripheral then advertises its capabilities, IP address and port number or name. The router 106 uses the advertisement to create a routing table with name-to-port-to-IP address associations. As shown in FIG. 4C for the system of FIG. 3, the routing table 130*b* associates the term image_reader with the HTTP port number 3500 and the dynamically allocated IP address 204.98.156.2, the term stripe_reader with the HTTP port number 3600 and the dynamically allocated IP address 204.98.156.3, and the term RFID_reader with the HTTP port number 3700 and the dynamically allocated IP address 204.98.156.4. Using this routing table 130*b*, the router 106 can forward messages to the computer peripherals 18 based either on name or port number.

In an additional embodiment, textual identifiers are dynamically associated with port numbers. This embodiment provides additional flexibility in a legacy environment where certain HTTP port numbers may already be in use. In this embodiment, a computer peripheral 18 advertises its capabilities, IP address and name. The router 106 uses the advertisement to create a routing table with name-to-port-to IP address associations. As shown in FIG. 4D for the system of FIG. 3, the routing table 130*c* associates the term image_reader with the dynamically allocated HTTP port number 5800 and the dynamically allocated IP address 75.210.52.2, the term stripe_reader with the dynamically allocated HTTP port number 1200 and the dynamically allocated IP address 75.210.52.3, and the term RFID_reader with the dynamically allocated HTTP port number 2600 and the dynamically allocated IP address 75.210.52.4. In a further embodiment (not shown), HTTP port numbers are not used and a routing table 130 associates textual identifiers directly with dynamically or statically allocated IP addresses.

In one embodiment when a computer peripheral 18 is detached as part of a procedure that allows for communication from the computer peripheral 18 before removal occurs, the computer peripheral 18 sends an advertisement that informs the router 106 that the computer peripheral 18 will no longer be in communication with the router 106. In response to this advertisement, the router 106 removes the port number and associated IP address entry for the computer peripheral 18 from the routing table 130. In addition, the router 106 removes that capabilities corresponding to the detached computer peripheral 18 from the capabilities list 109.

In alternative embodiments, procedures are defined to update the routing table 130 and the capabilities list 109 when a computer peripheral 18 is detached without the availability of prior communication, such as when a computer peripheral 18 is simply unplugged. In one such embodiment, the router 106 periodically polls the IP addresses listed in the routing table 130 to confirm that the corresponding computer peripherals 18 are still attached. In the event that a listed computer peripheral 18 does not respond, the routing table 130 and the capabilities list 109 are updated to reflect that the computer peripheral 18 has been removed, for example by using a bit that is either set or cleared.

In an additional embodiment, the mapping of HTTP ports to IP addresses is layered on top of the functionality of the Universal Plug and Play (UPnP) architecture. As described in the document "Universal Plug and Play Device Architecture" version 1.0 dated Jun. 8, 2000 and available at http://www.upnp.org/download/UPnPDA10_20000613.htm which document is herein incorporated by reference in its entirety. UPnP is an architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. UPnP is a distributed, open networking architecture that leverages TCP/IP and Web technologies to enable proximity networking in addition to control and data transfer among networked devices in the home, office, and public spaces.

Figure 4E:
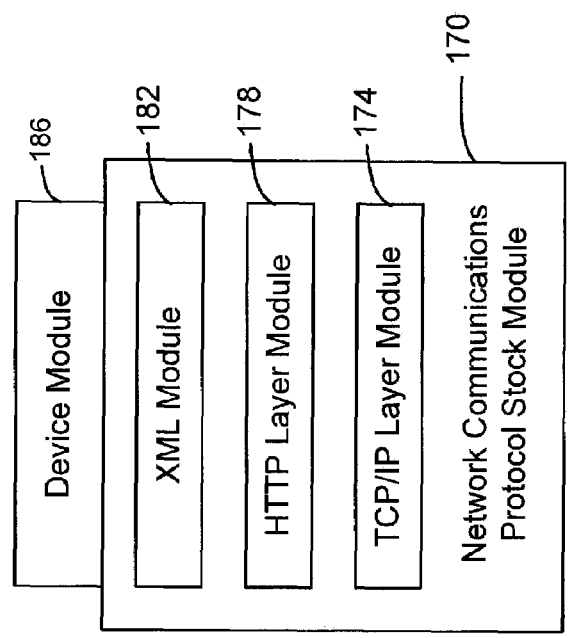
FIG. 4E includes a block diagram of a network communications protocol stack used by one of the functional components of FIG. 3.

FIG. 4E shows one embodiment of a network communications protocol stack module 170 employed by computer peripherals 18 in one embodiment of the system 10. The network communications protocol stack module 170 includes a TCP/IP layer module 174, a HTTP layer module 178, and a XML module 182. In one embodiment the TCP/IP layer module is replaced with a UDP layer module. In another embodiment, the XML module 182 is optional. The HTTP layer module 178 enables the computer peripherals 18 to function as web servers by allowing them to process and respond to HTTP requests. The XML module 182 enhances the functionality of the computer peripherals 18 by allowing the computer peripherals 18 to receive and process XML code, for example to parse XML documents to extract XML or HTML commands. In one embodiment, the XML code contains updated operating instructions allowing the computer peripherals 18 to modify or enhance their functionality. On top of the network communications protocol stack module 170 is a device module 186 specific to the particular computer peripheral 18. Among other operations, the device module 186 processes HTTP requests and translates them into the proper computer peripheral specific instructions. In various embodiments, the modules 170, 174, 178, 182, and 186 can be implemented in hardware and/or software.

Figure 5:
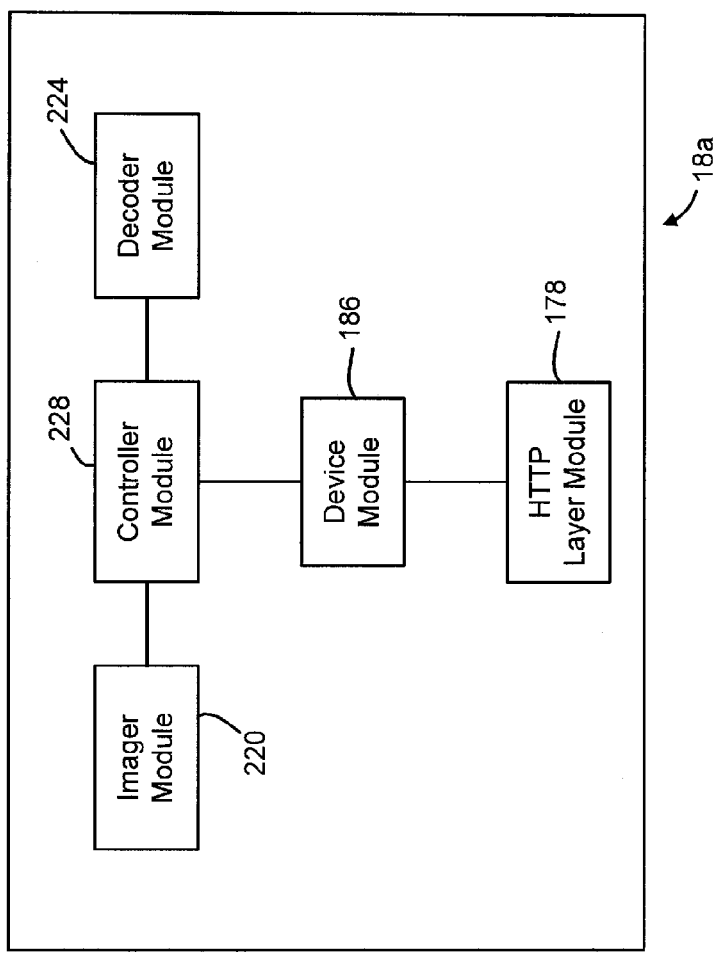
FIG. 5 shows the operational blocks of an image reader and decoder used in accordance with the invention.

With reference to FIG. 5, some of the operational components of one embodiment of the image reader and decoder 18a that are used in responding to a HTTP request are shown. The operational components include an imager module 220 for capturing an image of a one or two dimensional barcode, an indicia, a signature or a graphic, a decoder module 224 for decoding image data including bar codes and matrix symbols, a controller module 228 for controlling the operation of the imager module 220 and the decoder module 224, and the device module 186. In various embodiments, the modules 220, 224, and 228 can be implemented hardware and/or software.

In operation, the device module 186 receives a HTTP request, for example a request to scan a bar code, from the HTTP layer module 178. This HTTP request could include as part of the HTTP command:

GET=barcode

The device module 186, functioning like a device driver, processes the HTTP request translating GET=barcode into the proper computer peripheral specific instructions that are passed to the controller module 228. The controller module 228 then directs the imager module 220 to capture an image and the decoder module 224 to generate decoded bar code data from the image. The controller module 228 then passes the decoded bar code data to the device module 186 that in turn transmits the information to the HTTP layer module 178 that translates the information into a properly formatted HTTP response. To capture an image from the image reader and decoder 18a, the HTTP command line would only need to be modified to read:

GET=image

As indicated above, the details of interpreting the HTTP command, in this case GET=image, are handled by the computer peripheral 18 and are transparent to the client making the request.

Thus according to the invention, IT professionals and programmers in general are provided with a simplified process for integrating the use of computer peripherals 18 into the operation of computing devices 14. For example the invention simplifies the process of integrating the use of an image reader and decoder 18a and a magnetic stripe reader and decoder 18b into a transaction application executed by a PDT 14a. Among other aspects of the invention, this simplification is based on the transparent nature of HTTP commands and the relatively simple nature of HTML programming as compared with more complex programming languages such as C or C++.

Increasingly IT professionals and programmers for business applications approach the programming of their operations from a process perspective. The HTML programming language is well adapted to this purpose. For example an IT professional or a business application programmer developing a point-of-sale transaction application might first summarize some of the high level steps as:

read bar code collect credit card information

The IT professional or business application programmer could then easily translate these process steps into HTML code, as demonstrated by the following excerpt of HTML code that implements the two operations listed above:

```
<HTML>
    .
    .
    // Code for scanning a bar code
    <P>
        <INPUT type = "text" name = "barcode"
        src = "http://localhost:3500?GET = barcode"
    </P>
    .
    .
    // Code for reading a credit card
```

-continued

```
<P>
    <INPUT type = "text" name = "mag stripe"
    src = "http://localhost:3600?GET = mag stripe"
</P>
.
.
</HTML>
```

The main components in the HTML code above are the src commands that specify the location of the barcode and magnetic stripe inputs. These locations are given as HTTP Uniform Resource Locators (URLs) where the URLs are associated with a HTTP request and are of the form:

http://host:port/path?query where host specifies the server name or network address, such as an IP address, of the location of the resource, port specifies the local server port to be utilized in accessing the resource, path specifies the path on the server to the file or program (when provided, the server decides on the interpretation of this information), and query provides arguments to the program (again, the program decides the interpretation of the query terms). In one embodiment, the host:port combination provides an address for the computer peripheral 18 that can be used, for example, in accessing the computer peripheral 18 and in forwarding messages to the computer peripheral 18.

In the HTML code excerpt above, the host is specified as localhost. According to HTTP, the term localhost is interpreted as referring to the computing device 14, in this case the PDT 14a, running the browser 104. As such, when the browser 104 processes the HTTP request associated with the URL http://localhost:3500?GET=barcode a request is sent to the PDT 14a itself. The request includes the port number 3500 and the GET command with its associated information. Upon receiving the HTTP request, the PDT 14a passes the request to the router 106. Based on the routing table 130a, the router 106 passes the request to the image reader and decoder 18a attached to the physical interface 110a. The image reader and decoder 18a then processes the request as above and returns the decoded bar code data to the browser 104 through the router 106. As discussed above in one embodiment, the HTTP port numbers can be identified by name so that to address, for example, an image reader the term http://localhost:3500 can be replaced with http://localhost:image_reader

The process of getting credit card information from the magnetic stripe reader and decoder 18b is directly analogous to the process described above for getting barcode information.

As a further illustration of the interactive capabilities of the invention, the GET commands above could be replaced with other HTTP commands to provide different functionality, operation, and control. For example GET=barcode could be replaced with POST=set UPC. In one embodiment, this command is used to set an operational parameter of an image reader and decoder 18a. In particular, the POST=set UPC command could be used to configure the image reader and decoder 18a as to the type of data that will next be read. In so doing, the POST command can be used to optimize the operation of the image reader and decoder 18a by allowing it to process and decode received barcode data without first having to determine the data's barcode type. In other embodiments, the HTTP commands can be used to configure and access various operational parameters of the computer peripherals 18.

As indicated above, a significant advantage of the present invention is that the programming of a computing device 14 to utilize a computer peripheral 18 can be carried out in the simplified and widely familiar XML programming environment. With the invention, a broad range of computer peripherals 18 can now be treated in the same manner with the integration of each not requiring knowledge of advanced programming languages or manufacturer specific APIs. In addition as discussed above, the operational details of the computer peripherals 18 are transparent to the programmer. The programmer simply needs to understand the abstract concept performed by the computer peripherals 18 such as get barcode or get mag stripe.

A further advantage of the invention is that updating a computing device 14 to execute new code containing newly integrated computer peripherals 18 is greatly simplified. For example, updating the PDT 14a to execute a new transaction application utilizing the image reader and decoder 18a and the magnetic stripe reader and decoder 18b does not require recompiling the operating system of the PDT 14a and installing it on each of the PDTs 14a. In addition the invention avoids the barriers that are presented by integrating functionality into an operating system developed and maintained by a third party.

For example, as the execution of the transaction application is carried out by the browser 104, updating the PDT 14a to execute a new transaction application simply requires the browser 104 to download a new web page (for example the HTML document excerpted above) from the central computer 22. In particular, this process includes the programmer storing a single copy of the newly drafted transaction application on the web server 100. To acquire a local copy of the HTML document, the browser 104 would send a HTTP request associated with a URL of the form:

http://central.computer/PDTapps/transApp.html where the transaction application is entitled transApp.html and is stored in the PDTapps directory of the central computer 22. As is standard in HTTP running on TCP/IP, the request would include the unique address of the client so that that transApp.html could be returned to the appropriate PDT 14a. With a copy of the document, the browser 104 and hence the PDT 14a would be immediately capable of running the transaction application utilizing the attached computer peripherals 18. In one embodiment, the PDT 14a automatically requests updated operating code in response to a newly attached computer peripheral 18. The updated operating code could be the transaction application or it could simply be general functionality code that, for example, permitted a user to press one of the buttons 38 on the PDT 14a to initiate a bar code read or a similar operation for another attached computer peripheral 18.

Another aspect of the present invention is that each computer peripheral 18 has a unique network address due to its association with a particular PDT 14a. This unique network address in combination with the HTTP layer module 178 means that the computer peripheral 18 can function as a generic network device with respect to other devices attached to a network. For example referring to FIG. 1, any computing device 14 that supports HTTP and has access to the network 26 can direct a request to a particular computer peripheral 18.

In one embodiment, this addressability is used by the central computer 22 or the remote computer 30 to enhance the functionality of the computer peripherals 18.

Figure 6A:
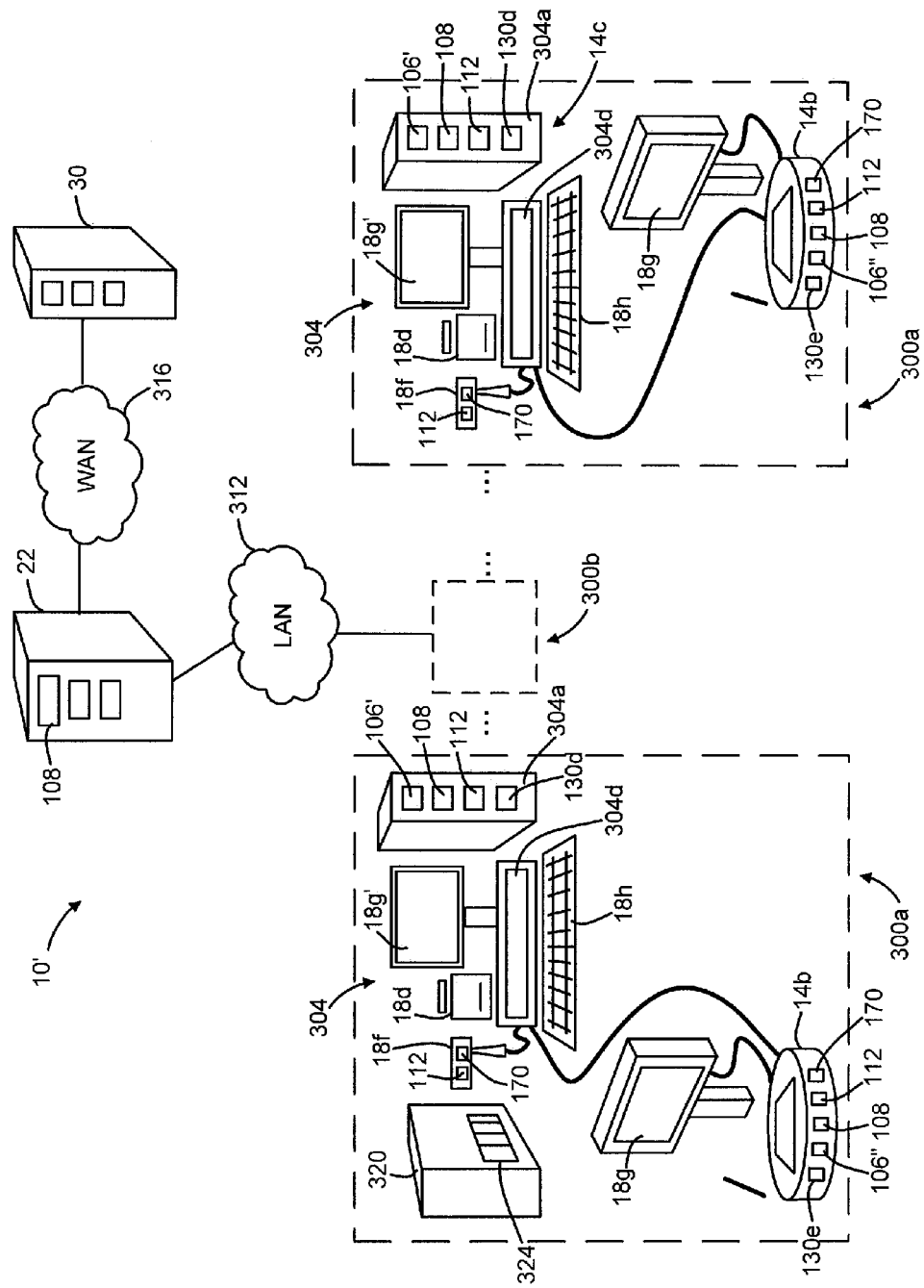
FIG. 6A shows an embodiment of a networked system of computing devices with attached computer peripherals according to the principles of the invention.

Referring to FIG. 6A, a system 10' that is an embodiment of the invention is shown. The system 10' displays the enhanced computer peripheral functionality enabled by the computer peripheral addressability aspect of the invention. The system 10' includes a plurality of point-of-sale locations 300a, . . . , 300n (generally 300) such as those that are commonly found in retail environments. Each point-of-sale location 300 includes a PC Point of Sale (POS) cash register 14c and a transaction terminal 14b. Attached to the transaction terminal 14b is a display 18g such as a flat panel display. The PC POS cash registers 14c and the transaction terminals 14b are connected to a local area network (LAN) 312, such as an Ethernet network or 802.11 wireless network. Additionally part of the system 10' and connected to the LAN 312 is the central computer 22. In the embodiment shown in FIG. 6A, the system 10' also includes the remote computer 30 connected to the central computer 22 via a wide area network (WAN) 316 such as the Internet. The PC POS cash register 14c typically includes a personal computer housed in a conventionally known PC housing 304a and multiple interfacing or associated components including a hand-held image reader and decoder 18f, a keyboard 18h, a cash register drawer 304d, a printer 18d, and a monitor 18g'. FIG. 6A also shows a product 320 with a barcode 324.

In one embodiment of the system 10', each PC POS cash register 14c includes a DHCP client 112 that in combination with a DHCP server 108 on the central computer 22 provides each PC POS cash register 14c with a unique dynamically allocated IP address. In addition each PC POS cash register 14c includes a DHCP server 108 and a router 106' and each computer peripheral 18 includes, as shown explicitly for the hand-held image reader and decoder 18f, a network communications protocol stack module 170 and a DHCP client 112. These components enable the PC POS cash register 14c to direct HTTP port addressed messages to the dynamically allocated IP addresses of the attached computer peripherals 18. In one embodiment, the HTTP enablement of the computer peripherals 18 allows them to be directly addressed from a central location by exploiting the HTTP localhost functionality described above.

The direct addressability of computer peripherals 18 can enhance the functionality of point-of-sale locations 300 in general and the hand-held image reader and decoder 18f in particular. For example, it is standard as part of purchasing goods in a retail environment at a point-of-sale location 300 that the barcode 324 on the product 320 will be read and decoded. The decoded barcode data is then used to perform a price look-up by using a price look-up table on the central server 22 that associates product numbers with product prices. These price look-ups can fail for a number of reasons including the price look-up table containing errors or the hand-held image reader and decoder 18f not being able to decode the barcode 324 due to, for example, physical distortions in the barcode 324. In response to such a failure, an operator of the point-of-sale location 300 may be required to request that a supervisor visit the point-of-sale location 300 to physically inspect the product 320.

An alternative approach enabled by one embodiment of the present invention is that in response to a failed price look-up, the hand-held image reader and decoder 18f involved in the transaction can be transmitted a request that directs the hand-held image reader and decoder 18f to take a graphical image of the product 320 and/or barcode 324. In addition to capturing the image, the request can direct the hand-held image reader and decoder 18f to provide instructions to the operator of the steps required to properly capture the image. Such instructions can be included in an XML document transmitted to the hand-held image reader and decoder 18f for presentation to the operator on a display located on the hand-held image reader and decoder 18f. After being captured, the image can be transmitted to a supervisor at a central location who can inspect the product 320 without needing to visit the point-of-sale location 300. In another embodiment, the image is transmitted to the central computer 22 for additional graphical processing and/or the generation of a report to resolve any errors in the price look-up table.

In another embodiment that demonstrates the scalability of the system 10', each transaction terminal 14b is equipped with a DHCP client 112, a DHCP server 108, a network communications protocol stack module 170 and a router 106". In this embodiment, the transaction terminal 14b functions both as a computing device 14 and as a computer peripheral 18. As with the hand-held image reader and decoder 18f described above, the DHCP client 112 is used as part of dynamically assigning an IP address to the transaction terminal 14b and configuring the router 106' with the transaction terminal's assigned HTTP port number. The DHCP server 108 on the transaction terminal 14b is used as part of dynamically assigning IP addresses to computer peripherals 18 attached to the transaction terminal 14b and configuring the router 106" to properly direct HTTP port addressed messages to the correct computer peripheral 18. In this embodiment, HTTP enabled computer peripherals 18 that could be attached to the transaction terminals 14b include but are not limited to image readers and decoders 18a, hand-held image readers and decoders 18f, magnetic stripe readers and decoders 18b, RFID readers and decoders 18c, biometric readers and decoders 18e (discussed below), the display 18g, etc. In one embodiment as above, each of these computer peripherals 18 includes a network communications protocol stack module 170 and a DHCP client 112.

In one embodiment of the invention, the transaction terminal 14b is attached to a magnetic stripe reader and decoder 18b, a fingerprint reader and decoder 18e, and the display 18g. In this embodiment, the HTTP port numbers of these computer peripherals 18 are, respectively, 3600, 3800, and 4100. In addition as indicated above, the PC POS cash register 14c is in communication with several computer peripherals 18f, 18d, 14b whose HTTP port numbers are 3500, 3900, and 4000 for, respectively, the hand-held image reader and decoder 18f, the receipt printer 18d, and the transaction terminal 14b.

FIG. 6B shows routing tables 130d, 130e used in one embodiment of the invention. The routing table 130d is used by one of the PC POS cash registers 14c and the routing table 130e is used by one of the transaction terminals 14b. To simplify the following discussion in order to highlight the invention, the details pertaining to the display 18g' and the keyboard 18h have been omitted. The IP address/port number associations in the routing tables 130d, 130e were created by a process similar to the process 150 of FIG. 4B. As shown, the routing table 130e associates the magnetic stripe reader and decoder 18b (port number 3600) with the IP address 198.106.18.2, the fingerprint reader and decoder 18e (port number 3800) with the IP address 198.106.18.3, and the display 18g (port number 4100) with the IP address 198.106.18.4. The routing table 130d associates the hand-held image reader and decoder 18f (port number 3500—in alternative embodiments the image reader and decoder 18a and the hand-held image reader and decoder 18f can be assigned different HTTP port numbers) with the IP address 28.126.5.2; the magnetic stripe reader and decoder 18*b* (port number 3600), the fingerprint reader and decoder 18*e* (port number 3800), the transaction terminal 14*b* (port number 4000) and the display 18*g* (port number 4100) all with the IP address 28.126.5.3; and the receipt printer 18*d* (port number 3900) with the IP address 25.126.5.4. As indicated, the IP address for each of the computer peripherals 18*b*, 18*e*, 18*g* attached to the transaction terminal 14*b* is the IP address of the transaction terminal 14*b*. This means that a message received by the PC POS cash register 14*c* addressed to, for example, the fingerprint reader and decoder 18*e* is first passed to the transaction terminal 14*b* as directed by the routing table 130*d*. The transaction terminal 14*b* then sends the message to the IP address 198.106.18.3 as directed by the routing table 130*e*.

The entries in the routing table 130*d* that associate the transaction terminal's computer peripherals 18*b*, 18*e*, 18*g* with the transaction terminal's IP address were developed in response to an advertisement from the transaction terminal 14*b*. As described above in one embodiment, the advertisement includes at least the HTTP port number of the transaction terminal 14*b*, the transaction terminal's IP address (as assigned by the PC POS cash register's DHCP server 108), the HTTP port numbers of the attached computer peripherals 18*b*, 18*e*, 18*g*, and a list of the capabilities of the transaction terminal 14*b* and the attached computer peripherals 18*b*, 18*e*, 18*g*. This information is used in generating the entries in the routing table 130*d* and a capabilities list for the PC POS cash register 14*c*. In one embodiment the transaction terminal's advertisement is sent when the transaction terminal 14*b* is first attached to the PC POS cash register 14*c*. In another embodiment, an advertisement is sent from the transaction terminal 14*b* whenever its capabilities are changed, e.g. whenever a computer peripheral is added or removed. In an additional embodiment, the transaction terminal 14*b* sends an advertisement at periodic intervals or in response to polling from the PC POS cash register 14*c*.

In a further embodiment, duplication in HTTP port numbers can arise. For example if a hand-held image reader and decoder 18*f* was attached to one of the transaction terminals 14*b* in FIG. 6A, the routing table 130*d* would include two port 3500 entries each with a different IP address. In general, potential HTTP port number conflicts are resolved by identifying one or more parameters that can be used to distinguish the computer peripherals 18. The conflict resolving protocols in turn frequently depend on the fact that each computer peripheral 18 has a unique IP address that allows the computer peripheral 18 to be individually addressed.

In one embodiment, messages identified by a HTTP port number that is associated with two or more IP addresses are forwarded to the computer peripheral 18 having the closest network proximity. In one embodiment, the determination of network proximity is based on an analysis of the network domain overlap between the IP address of the router and the IP addresses of the computer peripherals 18 sharing port numbers. In another embodiment, conflicts between HTTP port numbers are resolved by determining, and then selecting, the computer peripheral 18 with the latest version.

Frequently duplications in HTTP port numbers do not present operational difficulties as communications are initiated from a computer peripheral 18. These communications typically include the computer peripheral's unique IP address thereby enabling messages to be directed to the computer peripheral without ambiguity. Embodiments that include computer peripheral initiated communication include those employing event driven programming components. In one embodiment when data from a computer peripheral 18 is required, the governing application, such as the transaction application, enters a listening mode awaiting communication from a specified HTTP port. At this point, the computer peripheral 18 initiates communication with the governing program in response to, for example, an event such as a user pulling a trigger on a hand-held image reader and decoder 18*f*.

According to one embodiment of the invention, each device that assigns IP addresses has information pertaining to all of the devices within the domain to which it assigns IP addresses. In addition at each level in the IP assignment hierarchy, the assigning authority can directly address any device within its domain. For example in response to advertisements from the transaction terminal 14*b*, the hand-held reader and decoder 18*f*, and the receipt printer 18*d*, the capabilities list 130*d* includes details pertaining to all of the computer peripherals 18*b*, 18*d*, 18*e*, 18*f*, 18*g* and computing devices 14*b* within the domain of the PC POS cash register 14*c*. This information is in turn included in an advertisement from the PC POS cash register 14*c* to the central server 22. In one embodiment, the PC cash register's advertisement includes at least the capabilities and HTTP port number of the PC POS cash register 14*c* as well as those of the computer peripherals 18*b*, 18*d*, 18*e*, 18*f*, 18*g* and computing devices 14*b* within the PC POS cash register's domain. The advertisement also includes the IP address of the PC POS cash register 14*c*. In the central computer 22, the PC POS cash register's IP address will be associated with the PC POS cash register 14*c* itself as well as with the computer peripherals 18*b*, 18*d*, 18*e*, 18*f*, 18*g* and the computing devices 14*b* within the PC POS cash register's domain. The process of aggregating information and transmitting advertisements continues as long as there is a shared authority assigning IP addresses.

For example in one embodiment the central computer 22 and the remote computer 30 are part of a Virtual Private Network (VPN) and the remote computer 30 assigns an IP address to the central computer 22. In this embodiment, the central computer 22 would send an advertisement to the remote computer 30 listing the port numbers and capabilities of all of the devices within the network 312. In this manner at each level in the hierarchy, each device assigning IP addresses has information pertaining to the computer peripherals 18 and computing devices 14 within its domain. Further given the HTTP port-to-IP address mapping scheme discussed above, each of the computer peripherals 18 and computing devices 14 can be individually addressed.

In one embodiment the HTTP enablement of the computer peripherals 18 is used to provide enhanced flexibility and functionality for financial transactions. For example some financial transactions that involve amounts above a specified limit can require additional authorization to insure against losses from fraudulent uses. Such transactions can include but are not limited to ATM withdrawals, credit card purchases, debit card purchases and the like. A uniquely addressable HTTP enabled computer peripheral 18, such as the biometric reader and decoder 18*e*, can be used to provide this additional authorization.

In one embodiment, a process using the invention involves a customer requesting authorization to charge an account with a credit card, a debit card, a smartcard, a RFID card, a RF payment contact or contactless card or the like. As part of the request, a message is transmitted to a central financial processing facility. The authorization processes executed by the financial processing facility could be implemented on a computer system such as the remote computer 30. In response to the authorization request, the financial processing facility determines that the requested amount is in excess of the account's base limit. According to the protocols of the financial processing facility, any charges in excess of the base limit require additional authorization including the confirmation of the identity of the customer making the request as the account holder. To achieve such confirmation, the remote computer 30 sends a request forwarded by the central computer 22 to the PC POS cash register 14c for confirmation data.

In one embodiment of the invention, any computer peripheral 18 capable of collecting confirmation data is assigned a common HTTP port number, such as port 3800. According to this embodiment, the software executed on the remote computer 30 requesting the confirmation data and the software on the PC POS cash register 14c directing the financial transaction do not require details regarding the nature or implementation of the collection of the confirmation data. For example in one embodiment, any biometric reader and decoder 18e can equally well be employed. Assuming the identity confirming computer peripheral 18 meets a specified standard, the biometric reader and decoder 18e could be implemented as a finger print, iris, or other identity confirming biometric reader and decoder. According to this embodiment, the implementation and operational details concerning the identity confirmation are handled by the computer peripheral 18 and are transparent to the PC POS cash register 14c and the remote computer 30.

For example according to one embodiment if the identity confirming computer peripheral 18 is a finger print reader and decoder 18e, the steps required to collect the finger print data, such as instructions provided to the customer, are controlled by the finger print reader and decoder 18e itself. For example the process can be initiated by the PC POS cash register 14c with a HTTP request, such as GET=confirmation data In one embodiment in response to the confirmation data request, the fingerprint reader and decoder 18e transmits an XML page containing instructions that are to be presented to the user as to how to properly perform a fingerprint scan. These instructions can be presented on the display 18g and can include diagrams and text explaining to a customer the proper procedure for performing a finger print scan. In an additional embodiment, the computer peripherals 18 are able to communicate directly with each other so that, for example, the finger print reader and decoder 18e can communicate directly with the display 18g to present the instructions to the customer. In one embodiment, the direct communication between computer peripherals 18 is conducted according to the General Event Notification Architecture (GENA) as described more fully in the General Event Notification Architecture Base: Client to Arbiter document available at http://www.upnp.org/download/draft-cohen-gena-client-01.txt. The General Event Notification Architecture Base: Client to Arbiter document is hereby incorporated by reference in its entirety.

Once a scan has been performed, the fingerprint reader and decoder 18e can determine whether a valid scan was completed. In the event that the data collected was not satisfactory, the fingerprint reader and decoder 18e can direct the customer to perform an additional scan. In one embodiment prior to sending the additional instructions, the fingerprint reader and decoder 18e analyzes the initial data to determine a likely cause for the failed scan, such as inadequate pressure on the scanner, and includes a probable remedy in the additional instructions. As part of the additional instructions, the fingerprint scanner and decoder 18e can include an image file of the scan for presentation to the customer. Once a successful scan has been completed, the decoded identity confirming data is transmitted to the central financial processing facility for comparison with entries in a database of biometric data. In an alternative embodiment, the customer's correct biometric data is stored on a smart card that is accessed locally by the transaction terminal 14b. In this embodiment, the central financial processing facility is simply informed whether the additional confirmation was successful.

As indicated above because each computer peripheral 18 provides its own instructions and controls its own operation, the invention simplifies the process of drafting and maintaining software and of managing the hardware related to computing devices 14 with computer peripherals 18. For example according to the invention, a store with PC POS cash registers 14c can replace some subset of the hand-held readers and decoders 18f with new models or models from a different manufacture without operational complication. The new hand-held readers and decoders 18f maintain the same HTTP port number and differences in operation are handled by the new units themselves. Hence new units can be updated or replaced without the need to modify existing software or operational procedures. By decoupling the operational elements in programs using computer peripherals 18 and by allowing the computer peripherals 18 to function autonomously and transparently, the present invention simplifies the process for programmers, IT professionals, and system managers to integrated, update, and modify the use of computer peripherals 18.

Figure 7:
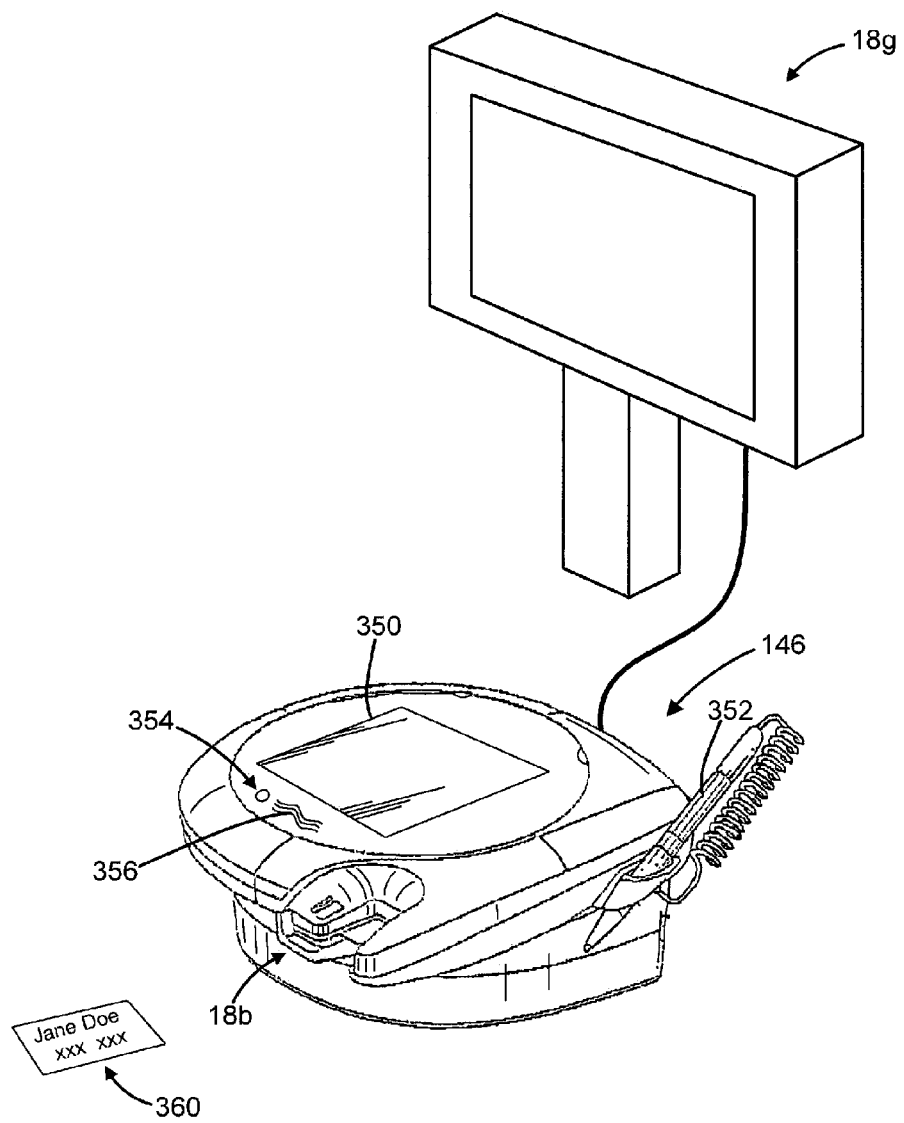
FIG. 7 shows an enlarged perspective drawing of the transaction terminal of FIG. 6A.

FIG. 7 shows an enlarged perspective drawing of the transaction terminal 14b of FIG. 6A. In various embodiments, the transaction terminal 14b can be one of the Transaction Team™ 8870 Image Kiosks, 8810 or 3101 Transaction Terminals, or 1500 Signature Capture Pads available from Hand Held Products, Inc. constructed in accordance with the invention. In operation the transaction terminal 14b may be adapted for reading card information, for secure receipt of personal identification (PIN) information, for signature capture, for secure interactive communications and numerous other functions.

The transaction terminal 14b includes a touch screen 350, a stylus 352, an indicator 354, an information message 356, and an integrated modular magnetic card reader and decoder 18b'. According to the invention, the integrated modular magnetic card reader and decoder 18b' can be replaced with other modular integrated computer peripherals such as those performing the functionality of image, smartcard, or biometric reading and decoding. The touch screen 350 and the stylus 352 are used as user interfaces to provide information to and receive information from a user/customer. The touch screen 350 includes a display and a touch pad overlay and among other functions serves as a virtual keypad and signature capture platform.

In the embodiment shown in FIG. 7, the transaction terminal 14b also includes an additional display screen 18g for presenting information to the user/customer. The display screen 18g can be a LCD flat panel display having a larger size and greater resolution than the touch screen 350 thereby enabling the presentation of more sophisticated graphics and/or animation than can be supported by the touch screen 350. A card 360 that is processed by the integrated modular magnetic card reader and decoder 18b' may be, for example, a credit card, a debit card, a customer loyalty card, an electronic benefits card, a company-sponsored benefits card, an identification card, a RFID card, a RF contact or contactless payment card and the like.

Security for the transaction terminal 14b is facilitated by the indicator 354 and the information message 356. In operation the indicator 354 is made responsive to a changing encryption mode signal so that the indicator 354 is active only when an encryption routine is called. Still further, in accordance with the secure information entry security feature, in one embodiment an information message 356 is displayed on or about the transaction terminal 14*b* or visible by a customer/user of the transaction terminal 14*b* that informs the customer-user that the customer/user should enter secure, e.g., PIN information, only if indicator 354 is active. Information message 356 is preferably substantially permanently affixed to the transaction terminal 14*b* so that an unscrupulous party cannot easily remove or destroy message 356. The operational details of the transaction terminal 14*b* discussed above also apply to the PDTs 14*a* and other computing devices 14 that can be used in accordance with the invention in having computer peripherals 18 attached.

Figure 8A:
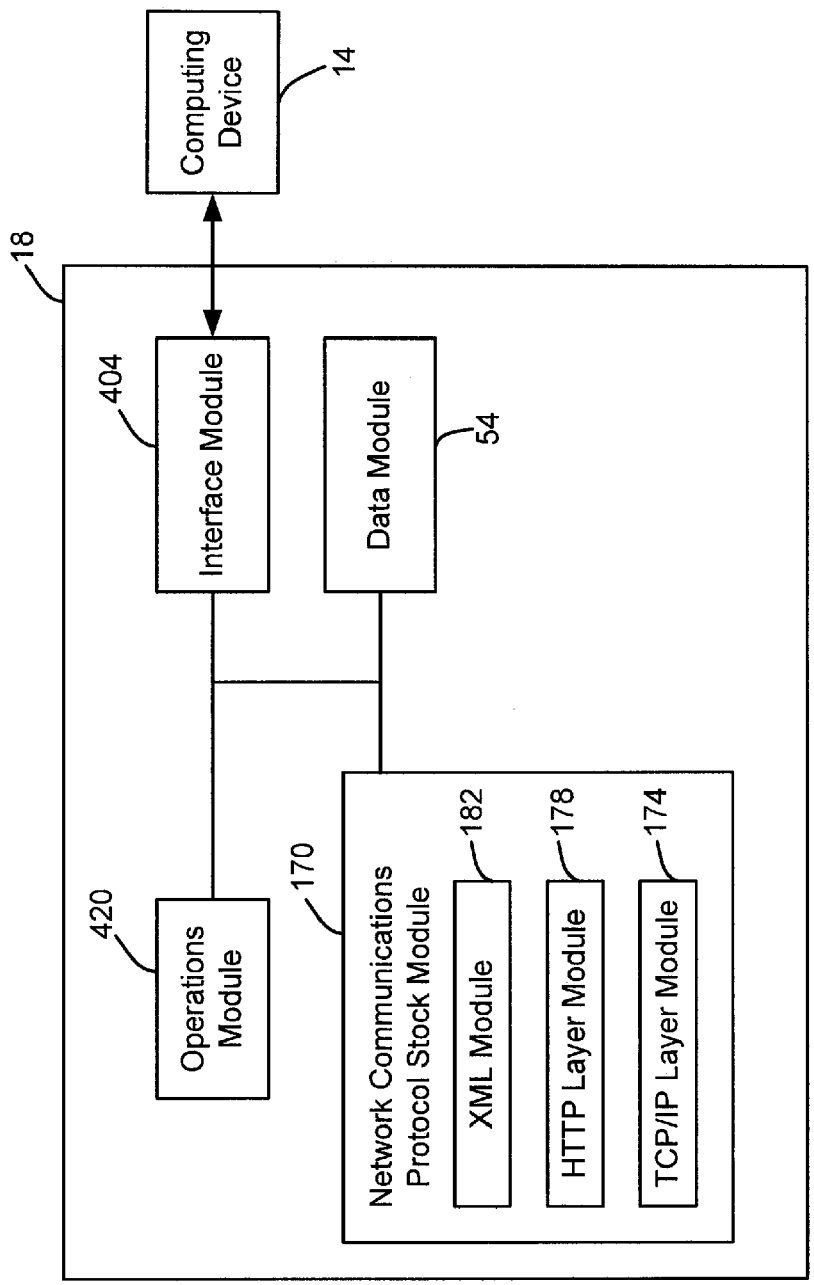
FIG. 8A shows one embodiment of some of the components in a computer peripheral constructed in accordance with the principles of the invention.

FIG. 8A shows some of the operational components present in one embodiment of a computer peripheral 18. The computer peripheral 18 augments the functionality of an associated computing device 14. In one embodiment, an associated computing device 14 is the computing device 14 that is in direct, immediate or first communication with the computer peripheral 18. In various embodiments the associated computing device 14 is of an arbitrary form factor and specifically can be a portable data terminal 14*a*, a transaction terminal 14*b*, a personal data assistant or a cash register 14*c*.

The operational components of the computer peripheral 18 include an interface module 404, a data module 54, an operations module 420, and a network communications protocol stack module 170. In various embodiments, the operations module 420 can provide control, device specific and supplemental functionality such as decoding. As discussed above with respect to FIG. 4E, the network communications protocol stack module 170 in one embodiment includes a TCP/IP layer module 174, a HTTP layer module 178, and optionally a XML module 182. Also as discussed above, the computer peripheral 18 has an address and the address includes a reference to the associated computing device 14. In one embodiment, the reference is the network address, such as the IP address, of the associated computing device 14. In another embodiment, the reference is a generalized reference, such as the localhost reference used in HTTP, that is translated into a specific reference to the associated computing device 14 when the generalized reference is interpreted by, for example, a browser.

In one embodiment each of the modules 54, 170, 174, 178, 182, 404, 420 in the computer peripheral 18 are in communication with each other and are implemented in a combination of hardware and/or software. For example as described with respect to FIG. 2C, the hardware can include PCBs, electrical components, and generic and function specific integrated circuit such as microprocessors and computer memory. The software routines can be stored in dedicated or programmable memories such as Programmable Read Only Memories (PROMs), Erasable Programmable Read Only Memories (EPROMs) and/or Electrically Erasable Programmable Read Only Memories (EEPROMs) for execution in a microprocessor. In alternative embodiments, one or more of the modules 54, 170, 174, 178, 182, 404, 420 are implemented entirely as hardware devices or software routines.

The interface module 404 enables exchange of communications with the associated computing device 14. In one embodiment, the association is a direct physical connection and the interface module 404 includes electrical and mechanical connectors for connecting with a corresponding interface module on the associated computing device 14. The mechanical and electrical connections can create a rigid or a flexible coupling between the computer peripheral 18 and the associated computing device 14. In an additional alternative embodiment, the interface module 404 enables communication without direct physical contact with the associated computing device 14 such as via a wireless connection. In one embodiment, the interface module is as described above with respect to the insertion portion 20 in FIG. 2C.

In some embodiments the data module 54 includes hardware that is designed to perform data input and/or data out functionality. In various embodiments, the functionality provided by the data module 54 includes scanning or reading bar codes, symbols, graphics or indicia, reading smart card data, reading biometric data, reading fingerprint data, reading RF payment data, reading RFID data, reading magnetic stripe card data, printing documents, displaying information, and the like. In alternative embodiments, the functionality provided by the data module 54 includes providing cursor position and keyboard stroke data. In another embodiment the data module 54 includes hardware that is designed to provide computer memory storage. In a further embodiment, the computer memory is supplemental to computer memory already present in the associated computing device 14 and can be designed for particular purposes such as fast storage and retrieval of digital information such as digitized images, video, sound, and/or text.

In another embodiment, the functionality provided by the data module 54 is lacking from the associated computing device 14 in the absence of the computer peripheral 18. For example in one embodiment, the PDT 14*a* of FIG. 2C does not include the capacity to read magnetic stripe data, read RFID data, print receipts or read finger print data prior to the attachment of, respectively, a magnetic stripe reader and decoder 18*b*, a RFID reader and decoder 18*c*, a printer 18*d*, or a biometric reader and decoder 18*e*..The computer peripherals 18*b*, 18*c*, 18*d*, and 18*e* are discussed in more detail below with respect to FIG. 8B.

As discussed above, the HTTP layer module 178 in the network communications protocol stack module 170 enables the computer peripheral 18 to respond to HTTP requests from the associated computing device 14. In some embodiments, messages from the associated computing device 14 are identified by HTTP port numbers or computer peripheral textual identifiers. The TCP/IP layer module 174 enables the transmissions of communications according to TCP/IP. In an alternative embodiment, the network communications protocol stack module 170 includes a UDP layer module that enables communications to be transmitted according to UDP. In alternative embodiments, other network communication protocols can be used in accordance with the invention. In some embodiments, the HTTP requests are transmitted from alternative devices such as a centralized computer. Also as discussed above, the optional XML module 182 parses XML documents transmitted from the associated computing device 14 or alternative sources. The commands contained in the XML document can be used to supplement or alter the operation of the computer peripheral 18.

In a further embodiment, the computer peripheral is integrated into the associated computing device 14. In one embodiment, the data module 54 is the imager 19, discussed above with respect to FIGS. 2A and 2B. As an example, the imager 19 can be integrated into an industrial manufacturing apparatus. In this embodiment, the imager 19 allows the industrial manufacturing apparatus to collect and analyze images as part of product assembly and quality control.

One implementation of some of the operational components of the computer peripheral 18 shown in FIG. 8A is the non-exhaustive components of the image reader and decoder 18*a* shown in FIG. 5 where the imager module 220 is contained in the data module 54; the device module 186, the controller module 228, and the decoder module 224 are contained in the operations module 420. The network communications protocol stack module 170 is common to both FIGS. 8A and 5.

Figure 8B:
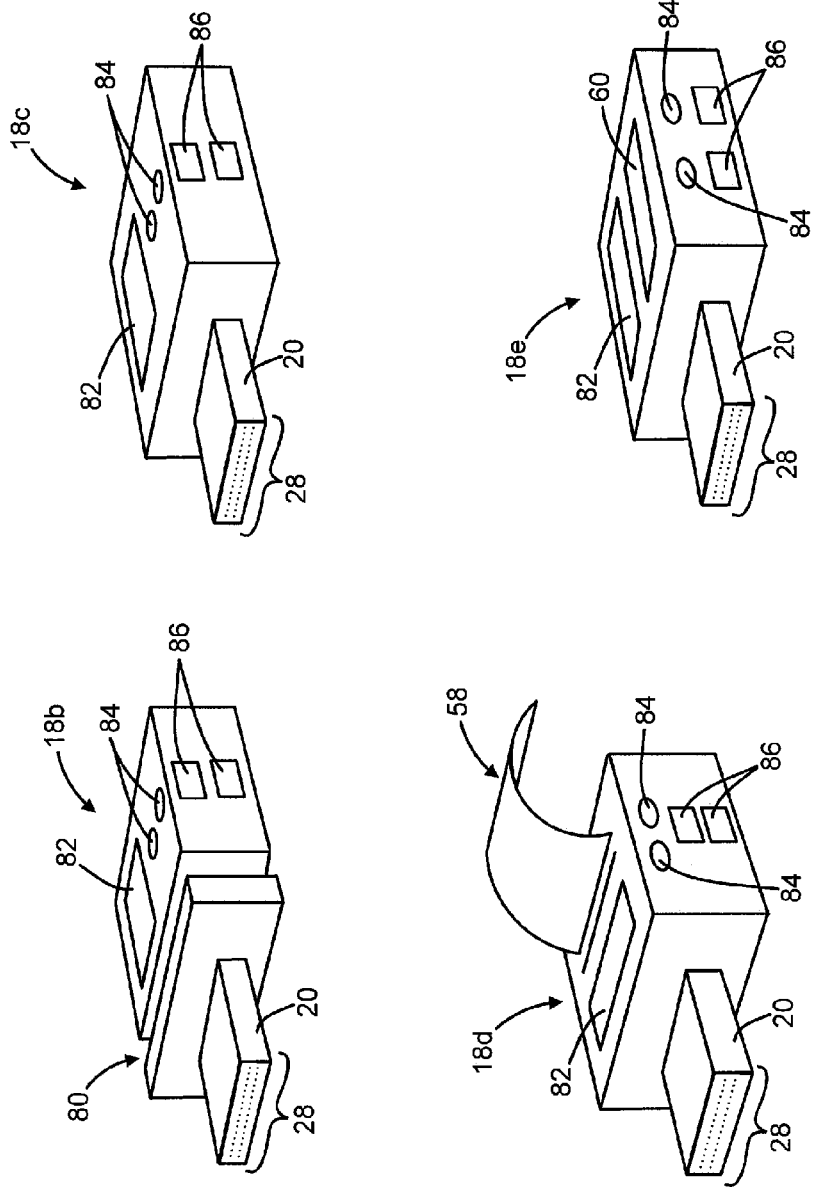
FIG. 8B shows some embodiments of computer peripherals constructed in accordance with the principles of the invention.

FIG. 8B shows details of embodiments of a non-exhaustive set of computer peripherals 18 that can be used in accordance with the invention. In one embodiment, the computer peripheral 18 is the magnetic stripe reader and decoder 18*b*. The magnetic stripe reader and decoder 18*b* includes a channel 80 for passing a magnetic stripe card such as a credit card, a display 82, interface indicators 84, and interface buttons 86. As with the image reader and decoder 18*a*, the magnetic stripe card reader and decoder 18*b* includes an electromechanical insertion portion 20 with a plurality of sockets 28 for coupling to pins 32 in an electromechanical reception 24 portion in a PDT 14*a*, a transaction terminal 14*b*, a PC POS cash register 14*c* or another computing device 14. In one embodiment the magnetic stripe card reader and decoder 18*b* can be one of the SCANTEAM® 6900 Magnetic Stripe Readers available from Hand Held Products, Inc. constructed in accordance with the invention. In an another embodiment the magnetic stripe card reader and decoder 18*b* can be replaced with a check reader and decoder such as one of the SCANTEAM® 8300 Check Readers available from Hand Held Products, Inc. constructed in accordance with the invention. In a further embodiment, the computer peripheral 18 is a smartcard reader and decoder 18*c*. In one embodiment the smartcard reader and decoder 18*c* is a RF payment reader for interrogating RF payment cards containing radio frequency transponders. In addition to interrogating the RF payment card to extract consumer and payment data, the RF payment reader can perform additional operations such as data processing including encryption and decryption of related information. As previously, the smart card reader and decoder 18*c* includes a display 82, interface indicators 84, interface buttons 86 and an electromechanical insertion portion 20 with a plurality of sockets 28 for coupling to pins 32 in an electromechanical reception 24 portion of a computing device 14. In an additional embodiment, the computer peripheral 18 is a printer 18*d* for printing a document 58 such as a receipt. As previously, the printer 18*d* includes a display 82, interface indicators 84, interface buttons 86 and an electromechanical insertion portion 20 with a plurality of sockets 28 for coupling to pins 32 in an electromechanical reception 24 portion of a computing device 14. In a further embodiment, the computer peripheral 18 is a fingerprint reader and decoder 18e with a biometric fingerprint scanner 60. As previously, the fingerprint reader and decoder 18*e* includes a display 82, interface indicators 84, interface buttons 86 and an electromechanical insertion portion 20 with a plurality of sockets 28 for coupling to pins 32 in an electromechanical reception 24 portion of a computing device 14. In additional embodiments, the biometric reader is an iris scanner, a voice recognition module, or a similar device for capturing identity confirming biometric information. Although the computer peripherals 18*b*, 18*c*, 18*d*, 18*e* shown in FIG. 8B include an electromechanical insertion portion 20 with a plurality of sockets 28 for coupling to pins 32 in an electromechanical reception 24 portion of a computing device 14, the connection with the computer peripheral 18 could be by alternative means such as a wireless, infrared or a cable connection.

In one embodiment, the computer peripherals 18 are attached to a computing device 14, such as a base unit, that provides basic computing operations. Specialized functionality, such as image reading and decoding or displaying information, is provided by the computer peripherals 18. In one embodiment, the base computing unit is contained within its own housing and includes an operating system, a graphical browser, a processor, a memory, and at least one electromechanical connector for connecting at least one computer peripheral 18. In this embodiment, the computer peripherals 18 are modular data collection units each of which is contained within its own housing and includes a processor, an electromechanical connector and a software module. The software module allows the modular data collection peripheral unit to respond to hypertext transfer protocol requests. As specialized units in some embodiments, the modular data collection units are devoid of some of the general purpose components contained in some embodiments of the base unit, such as a graphical browser.

In one embodiment, the modular data collection units are designed according to set of standardized parameters to facilitate their easy installation and exchange. For example in one embodiment, the electromechanical connectors are defined such that the modular data collection peripheral units are detachably attachable to the base unit by the base unit's electromechanical connector connecting to the computer peripheral's electromechanical connector.

Figure 9:
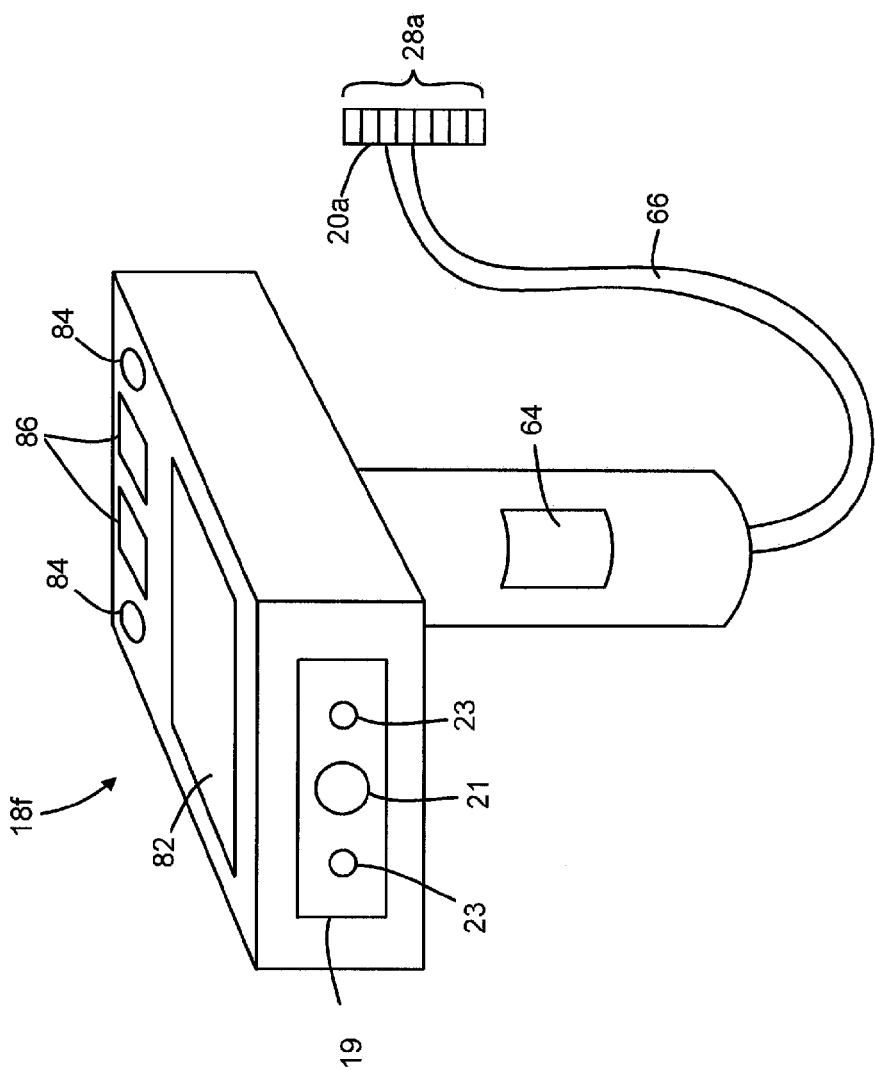
FIG. 9 shows a perspective drawing of one embodiment of the hand-held image reader and decoder of FIG. 6A.

FIG. 9 shows a perspective drawing of one embodiment of the hand-held image reader and decoder 18*f* discussed above. The hand-held image reader and decoder 18*f* includes an imager 19 having a lens 21 and a plurality of light sources 23, a display 82, interface indicators 84, interface buttons 86, and a trigger button 64. The hand-held image reader and decoder 18*f* also includes a cable 66 attached to a plug 20*a* including a plurality of pins 28*a* for establishing electrical communication with a computing device 14. In various embodiments, the hand-held image reader and decoder 18*f* can be any of the IMAGETEAM™ linear or area image readers such as the models 3800, 3870 and 4410 available from Hand Held Products, Inc. constructed in accordance with the invention. In alternative embodiments, the hand-held image reader and decoder 18*f* can be replaced with a SCANTEAM® 5700 Hand Held Laser Scanner, a VALUETEAM™ 3080 Contact CCD Scanner, or a SCANTEAM® 3700 Fixed Mount CCD all available from Hand Held Products, Inc. constructed in accordance with the invention.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, EEPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been particularly shown and described with reference to the preferred mode as illustrated in the drawings, it will be understood by one skilled in the art that various changes in detail may be effected therein without departing from the spirit and scope of the invention as defined by the claims. For example as mentioned, the embodiments utilizing a portable data terminal or a transaction terminal could equally well be constructed using the other device or an alternative computing device. In addition while transaction terminals and portable data terminal have generally been described as computing devices, they can function as computer peripherals in various embodiments as indicated above. In addition, the creation of computer peripherals that function as generic network devices due to the presence of a network communications protocol stack module including a HTTP layer module could equally be achieved with alternative network communication protocol layer modules. Further while some embodiments of the invention include placing network communications protocol stack modules including HTTP and TCP/IP layer modules in computer peripherals, similar network communications protocol stack modules may be required on additional devices in the network although their presence has not been explicitly shown.

We claim:

1. A method for enabling a router to forward a hypertext transfer protocol port number identified message, said method comprising:
    establishing communication between said router and a computer peripheral;
    assigning a network address to said computer peripheral;
    transmitting an advertisement by said computer peripheral, said advertisement including at least a hypertext transfer protocol port number assigned to said computer peripheral;
    configuring said router to associate said hypertext transfer protocol port number assigned to said computer peripheral with said network address of said computer peripheral; and
    forwarding said hypertext transfer protocol port number identified message to said computer peripheral based on at least said hypertext transfer port number assigned to said computer peripheral.

2. The method according to claim 1 wherein said forwarding said hypertext transfer protocol port number identified message to said computer peripheral is also based on at least determining a version of said computer peripheral.

3. The method according to claim 1 wherein said forwarding said hypertext transfer protocol port number identified message to said computer peripheral is also based on at least determining a network proximity of said computer peripheral.

4. The method according to claim 1 wherein said network address is an Internet protocol address.

5. The method according to claim 4 wherein said Internet protocol address is assigned by a Dynamic Host Configuration Protocol server.

6. The method according to claim 5 wherein said Internet protocol address is assigned in response to a request from a Dynamic Host Configuration Protocol client on said computer peripheral.

7. The method according to claim 1 wherein said advertisement further includes at least a list of capabilities of said computer peripheral.

8. The method according to claim 1 wherein said router is contained in a computing device, said computing device maintaining a list of capabilities of attached computer peripherals.

9. The method according to claim 8 further comprising transmitting an advertisement by said computing device, said advertisement from said computing device including at least hypertext transfer protocol port numbers of attached computer peripherals and capabilities of attached computer peripherals.

10. A system for enabling messages to be forwarded based on at least hypertext transfer protocol port numbers, said system comprising:
    a router in communication with a computer peripheral, said computer peripheral having an assigned hypertext transfer protocol port number; and
    a routing table in said router, said routing table configured to associate said assigned hypertext transfer protocol port number and an assigned network address in response to an advertisement from said computer peripheral, said advertisement including at least said assigned hypertext transfer protocol port number.

11. The system according to claim 10 wherein said network address is an Internet protocol address.

12. The system according to claim 11 wherein said Internet protocol address is assigned by a Dynamic Host Configuration Protocol server.

13. The system according to claim 12 wherein said Internet protocol address is assigned in response to a request from a Dynamic Host Configuration Protocol client on said computer peripheral.

14. The system according to claim 10 wherein said advertisement further includes at least a list of capabilities of said computer peripheral.

15. The system according to claim 10 wherein said router is contained in a computing device, said computing device maintaining a list of capabilities for a plurality of attached computer peripherals.

16. The system according to claim 15 wherein said computing device transmits an advertisement including at least hypertext transfer protocol port numbers and capabilities for each of said plurality of attached computer peripherals.

17. The system according to claim 15 wherein said computing device is a transaction terminal.

18. The system according to claim 15 wherein said computing device is a portable data terminal.

19. The system according to claim 15 wherein said computing device is a personal data assistant.

20. The system according to claim 15 wherein said computing device is a cash register.

21. The system according to claim 10 wherein said computer peripheral is an image reader.

22. The system according to claim 10 wherein said computer peripheral is an RFID reader.

23. The system according to claim 10 wherein said computer peripheral is an RF payment reader.

24. The system according to claim 10 wherein said computer peripheral is a smart card reader.

25. The system according to claim 10 wherein said computer peripheral is a biometric reader.

26. The system according to claim 10 wherein said computer peripheral is a finger print reader.

27. The system according to claim 10 wherein said computer peripheral is a receipt printer.

28. The system according to claim 10 wherein said hypertext transfer protocol port numbers are assigned dynamically.

29. An apparatus for enabling a router to forward hypertext transfer protocol port number identified messages, said apparatus comprising:

- means for establishing communication between said router and a computer peripheral;
- means for assigning a network address to said computer peripheral;
- means for transmitting an advertisement by said computer peripheral, said advertisement including at least a hypertext transfer protocol port number assigned to said computer peripheral;
- means for configuring said router to associate said hypertext transfer protocol port number assigned to said computer peripheral with said network address of said computer peripheral; and
- means for forwarding said hypertext transfer protocol port number identified message to said computer peripheral based on at least said hypertext transfer port number assigned to said computer peripheral.

30. The apparatus according to claim 29 wherein said forwarding said hypertext transfer protocol port number identified message to said computer peripheral is also based on at least determining a version of said computer peripheral.

31. The apparatus according to claim 29 wherein said forwarding said hypertext transfer protocol port number identified message to said computer peripheral is also based on at least determining a network proximity of said computer peripheral.

32. The apparatus according to claim 29 wherein said network address is an Internet protocol address.

33. The apparatus according to claim 32 wherein said Internet protocol address is assigned by a Dynamic Host Configuration Protocol server.

34. The apparatus according to claim 33 wherein said Internet protocol address is assigned in response to a request from a Dynamic Host Configuration Protocol client on said computer peripheral.

35. The apparatus according to claim 29 wherein said advertisement further includes at least a list of capabilities of said computer peripheral.

36. The apparatus according to claim 29 wherein said router is contained in a computing device, said computing device maintaining a list of capabilities of attached computer peripherals.

37. The apparatus according to claim 36 further comprising means for transmitting an advertisement by said computing device, said advertisement from said computing device including at least hypertext transfer protocol port numbers of attached computer peripherals and capabilities of attached computer peripherals.

\* \* \* \* \*